US006922434B2

(12) United States Patent
Wang et al.

(10) Patent No.: US 6,922,434 B2
(45) Date of Patent: Jul. 26, 2005

(54) APPARATUS AND METHODS FOR FINGER DELAY SELECTION IN RAKE RECEIVERS

(75) Inventors: Yi-Pin Eric Wang, Cary, NC (US); Gregory E. Bottomley, Cary, NC (US); Kenzo Urabe, Tokyo (JP)

(73) Assignee: Ericsson Inc., Research Triangle Park, NC (US)

( * ) Notice: Subject to any disclaimer, the term of this patent is extended or adjusted under 35 U.S.C. 154(b) by 836 days.

(21) Appl. No.: 09/845,950

(22) Filed: Apr. 30, 2001

(65) Prior Publication Data

US 2001/0028677 A1 Oct. 11, 2001

Related U.S. Application Data

(63) Continuation-in-part of application No. 09/420,957, filed on Oct. 19, 1999.
(60) Provisional application No. 60/257,439, filed on Dec. 22, 2000.

(51) Int. Cl.[7] .................................................. H04B 1/69

(52) U.S. Cl. ...................................... 375/148; 375/150

(58) Field of Search ................................ 375/148, 150, 375/348; 370/335

(56) References Cited

U.S. PATENT DOCUMENTS

| 5,572,552 | A | | 11/1996 | Dent et al. ................... 375/343 |
| 5,615,209 | A | | 3/1997 | Bottomley .................. 370/342 |
| 5,671,221 | A | | 9/1997 | Yang ........................... 370/320 |
| 5,673,291 | A | | 9/1997 | Dent ........................... 375/262 |
| 5,987,016 | A | * | 11/1999 | He .............................. 370/335 |
| 6,125,137 | A | * | 9/2000 | Wang et al. ................. 375/148 |
| 6,160,841 | A | * | 12/2000 | Stansell et al. ............. 375/148 |
| 6,377,615 | B1 | * | 4/2002 | Sourour et al. ............. 375/150 |
| 6,658,046 | B1 | * | 12/2003 | Miura ......................... 375/148 |

FOREIGN PATENT DOCUMENTS

| EP | 0 749 215 A2 | 12/1996 | |
| EP | 0 749 215 A | 12/1996 | ............ H04B/7/02 |
| EP | 0825 727 A1 | 2/1998 | |
| EP | 0 825 727 A | 2/1998 | ........... H04B/1/707 |
| WO | WO 96/10873 | 4/1996 | |
| WO | 01 13530 A | 2/2001 | ........... H04B/1/707 |

OTHER PUBLICATIONS

International Search Report for PCT/US01/49268 dated Jun. 26, 2002.
Adachi et al. "Wideband DS–CDMA for Next–Generation Mobile Communications Systems." *IEEE Communications Magazine.* Sep., 1998, pp. 56–59.
Barbosa et al., "Adaptive Detection of DS/CDMA Signals in Fading Channels." *IEEE Trans. Commun.* vol. 46, Jan. 1998, pp. 115–124.
Bottomley et al. "Adaptive Arrays and MLSE Equalization." Proc. 1995 IEEE 45th Vehicular Technology Conference (VTC 95). Chicago, Jul. 25–28, 1995, 5 pp.

(Continued)

*Primary Examiner*—Amanda T. Le
*Assistant Examiner*—Cicely Ware
(74) *Attorney, Agent, or Firm*—Myers Bigel Sibley & Sajovec

(57) ABSTRACT

Methods of recovering information encoded in a spread spectrum signal transmitted according to a spreading sequence in a communications medium are provided in which a spread spectrum signal is received from the communications medium and correlated with a spreading sequence to produce a plurality of time-offset correlations. Some of these time-offset correlations may be designed to cancel out known interfering signals. A subset of the plurality of time-offsets may then be selected, and corresponding traffic correlations may then be combined using a weighted combination to estimate information encoded in the transmitted spread spectrum signal. Receivers for implementing these methods are also provided.

48 Claims, 15 Drawing Sheets

OTHER PUBLICATIONS

Bottomley. "Optimizing the Rake Receiver for the CDMA Downlink." Proceedings of the $43^{rd}$ IEEE Vehicular Technology Conference. Secaucus, NJ, May 18–20, 1993.

Dahlman et al. "UMTS/IMT–2000 Based on Wideband CDMA." *IEEE Communications Magazine*. Sep. 1998, pp. 70–80.

Davis et al. "A Noise Whitening Approach to Multiple–Access Noise Rejection–Part II: Implementation Issues." *IEEE Journal on Selected Areas in Communications*. vol. 14, Oct. 1996, pp. 1488–1499.

Dent et al. "CDMA–IC: A Novel Code Division Multiple Access Scheme Based on Interference Cancellation." in Proc. PIMRC. Boston, MA, Oct. 1992, pp. 4.1.1–4.1.5.

Dinan et al., "Spreading Codes for Direct Sequence CDMA and Wideband CDMA Cellular Networks." *IEEE Communications Magazine*. Sep. 1998, pp. 48–54.

Duel–Hallen et al. "Multiuser Detection of CDMA Systems." *IEEE Personal Communications Magazine*. vol. 2, Apr. 1995, pp. 46–58.

Ewerbring et al. "CDMA with Interference Cancellation: A Technique for High Capacity Wireless Systems." In Proc. IEEE Int. Conf. Commun., Geneva, Switzerland, 1993.

Gumas. "A Century Old, the East Hadamard Tranform Proves Useful in Digital Communications." *Personal Engineering*. Nov., 1997, pp. 57–63.

Harris et al. *Handbook of Mathematics and Computer Science*. Springer–Verlag Publishing, New York, 1998, pp. 456–457.

Hottinen et al. "Multi–User Detection For Multi–Rate CDMA Communications," in Proc. IEEE Int. Conf. Commun. Dallas, TX, Jun. 24–28, 1996.

Jamal et al. "Adaptive MLSE Performance on the D–AMPS 1900 Channel." *IEEE Transactions on Vehicular Technology*, vol. 46, Aug. 1997, pp. 634–641.

Juntti, M.J. "Multi–User Detector Performance Comparisons in Multi–Rate CDMA Systems." in Proc. IEEE VTC '98. Ottawa, Canada, May 1998, pp. 31–35.

Juntti, M.J. "System Concept Comparisons for Multi–Rate CDMA Systems with Multi–User Detection." in Proc. IEEE VTC '98, Ottawa, Canada May 1998, pp. 36–40.

Klein. "Data Detection Algorithms Specifically Designed for the Downlink of CDMA Mobile Radio Systems." 1997 IEEE Vehicular Technology Conference, Phoenix, AZ, May 4–7, 1997.

Kohno et al. "Combination of an Adaptive Array Antenna and Canceller of Interference for Direct–Sequence Spread–Spectrum Multiple–Access System." *IEEE Journal on Selected Areas in Communication*. vol. 8, No. 4, May 1990.

Liu et al., "Blind Equalization in Antenna Array CDMA Systems." *IEEE Trans. Sig. Proc.* vol. 45, Jan. 1997, pp. 161–172.

Madhow et al. "MMSE Interference Suppression for Direct–Sequence Spread–Spectrum Communication." *IEEE Trans. Commun.* vol. 42, Dec. 1994, pp. 3178–3188.

Madkour et al., "Multi–Rate Multi–Code CDMA Using FWT for Mobile and Personal Communications." Proceedings of the Ninth IEEE International Symposium on Personal, Indoor and Mobile Radio Communications. The Marriott Copley Place, Boston, MA, Sep. 8–11, 1998.

Mailaender et al. "Linear Single–User Detectors for Asynchronous and Quasi–Synchronous CDMA." in Proc. $29^{th}$ Annual Conference on Info. Sciences and Systems (CISS '95), Johns Hopkins University, 1995, pp. 199–204.

Monk et al. "A Noise Whitening Approach to Multiple Access Noise Rejection–Part I: Theory and Background." *IEEE Journal on Selected Areas in Communications*, vol. 12, Jun. 1994, pp. 817–827.

Muszynski, P. "Interference Rejection Rake–Combining for WCDMA." First Intl. Symposium Wireless Personal Multimedia (WPMC '98), Yokosuka, Japan pp. 93–98, Nov. 4–6, 1998.

Naguib et al. "Performance of CDMA Cellular Networks with Base–Station Antenna Arrays." Presented at the 1994 International Zurich Seminar on Digital Communications (no date).

Ng et al. "A Structured Channel Estimator for Maximum–Likelihood Sequence Detection." *IEEE Commun. Letters*, vol. 1, Mar. 1997, pp. 52–55.

Ojanpera et al. "Qualitative Comparison of Some Multi–User Detector Algorithms for Wideband CDMA." in Proc. IEEE VTC '98. pp. 46–50, Ottawa, Canada, May 1998.

Patel et al. "Analysis of a DS/CDMA Successive Interference Cancelllation Scheme in DS/CDMA System using Correlations." in Proc. GLOBECOM, Houston, TX, pp. 76–80, 1993.

Patel et al.. "Analysis of a Simple Successive Interference Cancellation Scheme in DS/CDMA System." IEEE JSAC, vol. 12, No. 5, pp. 796–807, Jun. 1994.

Pateros et al. "An Adaptive Correlator Receiver for Direct–Sequence–Spread–Spectrum Communication." *IEEE Trans. Commun.* vol. 44, Nov. 1996, pp. 1543–1552.

Peterson et al. "Introduction to Spread–Spectrum Communications." Prentice Hall International, Inc. 1995, pp. 540–547.

Picinbono, B. "On Circularity." *IEEE Trans. Sig. Proc.* vol. 42, Dec. 1994, pp. 3473–3482.

Picinbono, B. "Second–Order Complex Random Vectors and Normal Distributions." *IEEE Trans. Sig. Proc.* vol. 44, Oct. 1996, pp. 2637–2640.

Wang et al. "Blind–Multi–User Detection: A Subspace Approach," IEEE Trans. Info. Theory, vol. 44, No. 2, Mar. 1998, pp. 677–690.

Yoon et al. "A Spread–Spectrum Multiaccess System with Cochannel Interference Cancellation for Multipath Fading Channels." *IEEE J. Select. Areas in Commun.* vol. 11, No. 7, Sep. 1993, pp. 1067–1075.

Yoon et al. "Matched Filtering in Improper Complex Noise and Applications to DS–CDMA," Sixth IEEE Intl. Symp. Personal, Indoor, Mobile Radio Commun. (PIMRC '95), Toronto, Sep. 27–29, 1995.

Yoon et al. "Matched Filters with Interference Suppression Capabilities for DS–CDMA," *IEEE J. Select. Areas in Commun.* vol. 14, Oct. 1996, pp. 1510–5121.

Yoon et al. "Maximizing SNR in Improper Complex Noise and Applications to CDMA." *IEEE Commun. Letters*. vol. 1, Jan. 1997, pp. 5–8.

Zvonar et al. "Sub–Optimal Multi–User Detector for Frequency Selective Rayleigh Fading Synchronous CDMA Channels," *IEEE Trans. Commun.* vol. 43, No. 2–4, Feb.–Apr. 1995, pp. 154–157.

Bottomley et al. "A Generalized RAKE Receiver for Interference Suppression" IEEE Journal Communications, vol. 18, No. 8, Aug. 2000.

Wang et al. "Generalized RAKE Reception for Cancelling Interference from Multiple Base Stations", Proceedings of IEEE VTS Vehicular Technology Conference, Fall, 2000, Boston.

Wong et al. "A Linear Receiver for Direct–Sequence Spread–Spectrum Multiple–Access Systems with Antenna Arrays and Blind Adaptation" IEEE Transactions Information Theory, vol. 44, No. 2, Mar. 1998.

J.W. Harris and H. Stocker, "Handbook of Mathematics and Computer Science," New York, Springer–Verlag, 1998.

* cited by examiner

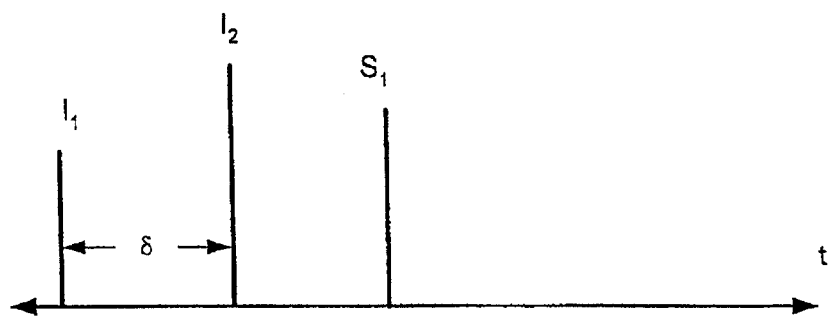
Fig. 13A
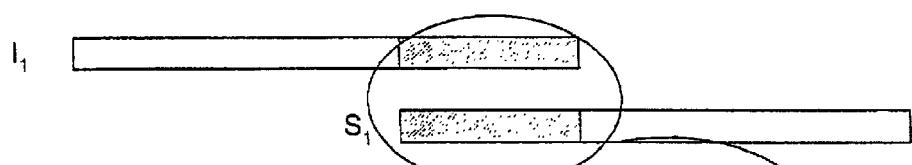
Despreading
Fig. 13B
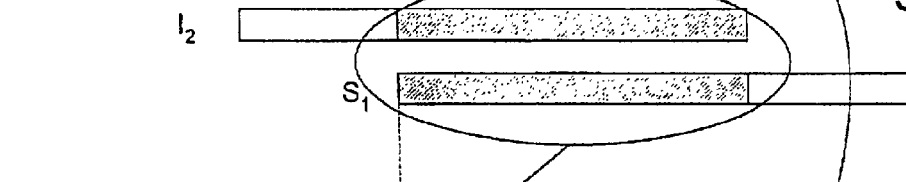
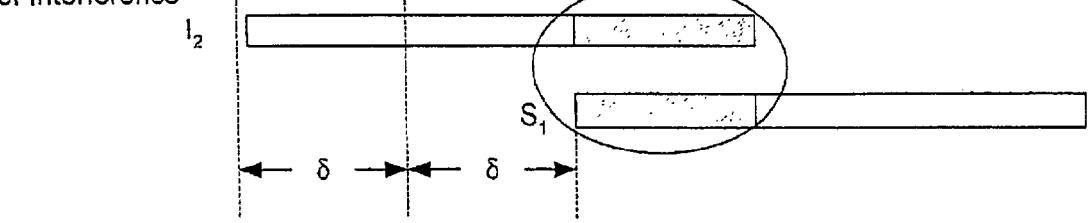
Mirror Images of Interference
Fig. 13C

APPARATUS AND METHODS FOR FINGER DELAY SELECTION IN RAKE RECEIVERS

RELATED APPLICATIONS

This application claims the benefit of U.S. Provisional Application No. 60/257,439; filed Dec. 22, 2000. This application is a continuation-in-part of prior application Ser. No. 09/420,957, filed Oct. 19, 1999, the disclosure of which is incorporated by reference herein in its entirety.

BACKGROUND OF THE INVENTION

The present invention relates to communications methods and apparatus, and more particularly, to spread spectrum communications methods and apparatus. Wireless communications systems are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Several types of access techniques are conventionally used to provide wireless services to users of wireless systems. Traditional analog cellular systems generally employ a system referred to as frequency division multiple access (FDMA) to create communications channels, wherein discrete frequency bands serve as channels over which cellular terminals communicate with cellular base stations. Typically, these bands are reused in geographically separated cells in order to increase system capacity. Modern digital wireless systems typically utilize different multiple access techniques such as time division multiple access (TDMA) and/or code division multiple access (CDMA) to provide increased spectral efficiency. In TDMA systems, such as those conforming to the GSM or IS-136 standards, carriers are divided into sequential time slots that are assigned to multiple channels such that a plurality of channels may be multiplexed on a single carrier. CDMA systems, such as those conforming to the IS-95 standard, achieve increased channel capacity by using "spread spectrum" techniques wherein a channel is defined by modulating a data-modulated carrier signal by a unique spreading code, i.e., a code that spreads an original data-modulated carrier over a wide portion of the frequency spectrum in which the communications system operates.

Conventional spread-spectrum CDMA communications systems commonly use so-called "direct sequence" spread spectrum modulation ("DS-CDMA"). In direct sequence modulation, a data-modulated carrier is directly modulated by a spreading code or sequence before being amplified by a power amplifier and transmitted over a communications medium, e.g., an air interface. The spreading code typically includes a sequence of "chips" occurring at a chip rate that typically is much higher than the bit rate of the data being transmitted.

In a typical DS-CDMA system, data streams from different users are subjected to various signal processing steps, such as error correction coding or interleaving, and spread using a combination of a user specific spreading code and a group-specific scrambling code. The coded data streams from the users are then combined, subjected to carrier modulation and transmitted as a composite signal in a communications medium.

A RAKE receiver structure is commonly used to recover information corresponding to one of the user data streams in a DS-CDMA system. In a typical RAKE receiver, a received composite signal is typically correlated with a particular spreading sequence assigned to the receiver. Correlations are performed at a plurality of different times (e.g., delays) to produce a plurality of time-offset correlations. The correlations are then combined in a weighted fashion, i.e., respective correlations are multiplied by respective weighting factors and then summed to produce a decision statistic.

The performance of CDMA systems generally is limited by interference among different user signals. Spreading/despreading provides a degree of interference suppression, but the number of users is generally limited by interference. Conventional RAKE reception techniques generally treat interference as uncorrelated (white) noise. Thus, conventional RAKE receivers typically used the complex conjugates of channel coefficients estimated by a channel estimator as weighting factors. Such an approach may yield less than desirable results in CDMA systems, because the passing of interfering signals through the dispersive medium generally introduces correlation into the noise at the receiver.

SUMMARY OF THE INVENTION

According to embodiments of the present invention, methods of recovering information encoded in a spread spectrum signal transmitted according to a spreading sequence in a communications medium are provided. Pursuant to these methods, a composite signal including the spread spectrum signal may be received from the communications medium and then correlated with the spreading sequence to produce a plurality of time-offset correlations of the composite signal with the spreading sequence. Some of these time-offset correlations may be selected to facilitate canceling out known interfering signals. A subset of the plurality of time-offset correlations may then be selected for combining using a weighted combination to estimate information encoded in the transmitted spread spectrum signal. Signal processors for implementing these methods are also provided.

BRIEF DESCRIPTION OF THE DRAWINGS

FIGS. 13A–13C together comprise a schematic diagram illustrating how to select probing fingers to cancel interference from an interfering base station according to embodiments of the present invention.

DETAILED DESCRIPTION OF THE INVENTION

Figure 1:
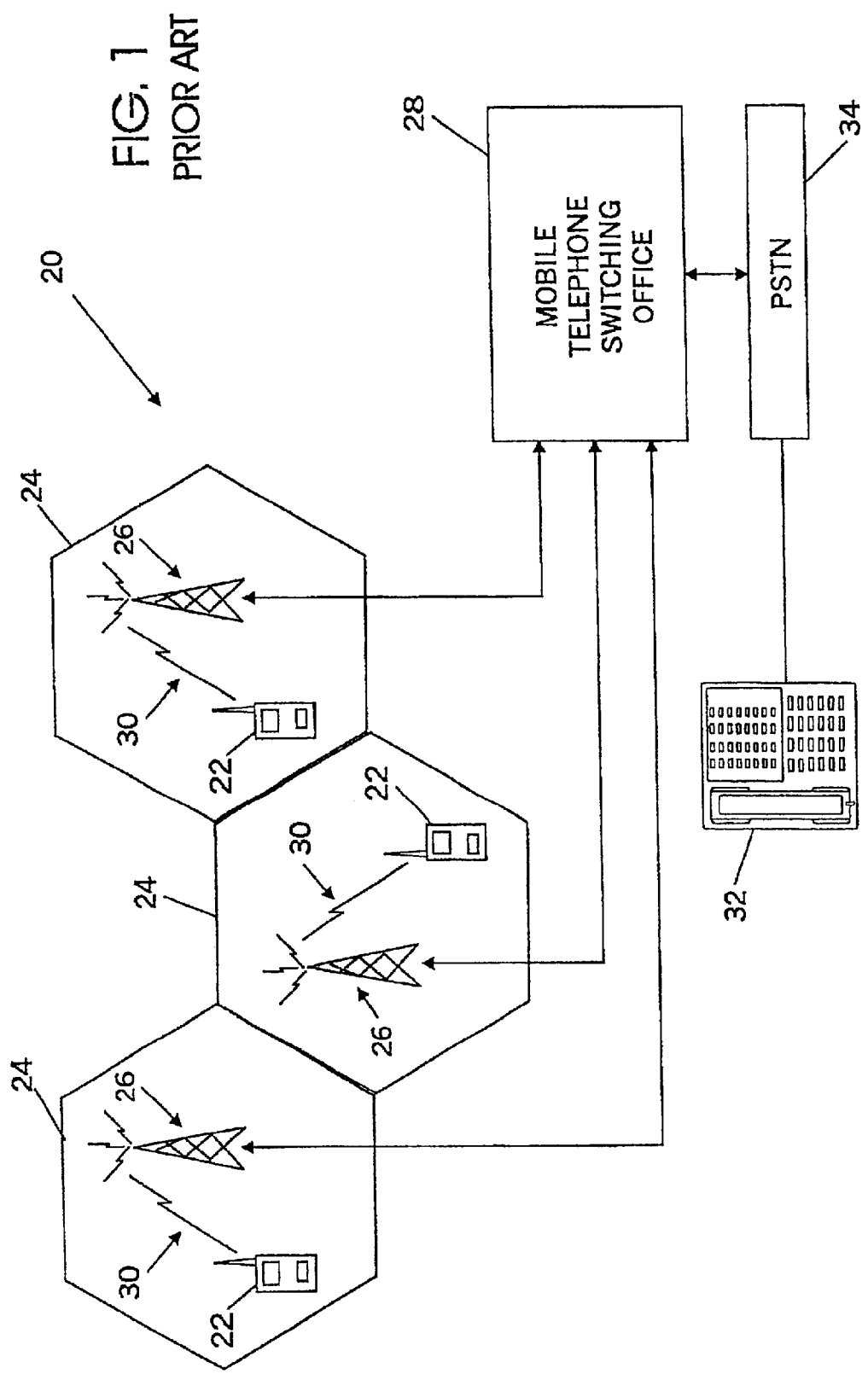
FIG. 1 is a schematic diagram illustrating a conventional terrestrial cellular communications system.

The present invention now will be described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. In the drawings, like numbers refer to like elements.

The discussion herein relates to wireless communications systems, and more particularly, to wireless code division multiple access (CDMA) systems, for example, systems conforming to the IS-95 standards or to proposed standards for wideband CDMA (WCDMA, CDMA2000, and the like). In such wireless communications systems, one or more antennas radiate electromagnetic waveforms generated by a transmitter located, for example, in a mobile terminal or base station. The waveforms are propagated in a radio propagation environment, and are received by a receiver via one or more antennas. It will be understood that, although the description herein refers to a radio environment, apparatus and methods are applicable to other environments, such as wireline communications and recovery of data from magnetic storage media.

In CDMA systems, information symbols are sent by modulating a traffic spreading sequence. A pilot channel is also sent, using a pilot spreading sequence. The present invention will be described with respect to a system that employs a pilot channel. However, the invention is not limited to such a system. If a pilot channel is not present or does not traverse the same channel as the traffic, then pilot symbols may be present in the traffic channel and may be used to estimate receiver parameters. If neither a pilot channel nor pilot symbols are present, then the receiver parameters may be obtained from traffic correlations using decision feedback.

Soft handoff is used in CDMA systems to improve performance. In this situation, the receiver receives signals from multiple base stations and uses these signals to recover information. Note that different base stations typically employ different spreading sequences. Thus, correlations corresponding to a particular base station would use the corresponding despreading sequences.

FIG. 1 illustrates a typical terrestrial cellular radiotelephone communication system 20 in which the apparatus and methods of the present invention may be utilized. The cellular radiotelephone system 20 may include one or more radiotelephones (terminals) 22, communicating with a plurality of cells 24 served by base stations 26 and a mobile telephone switching office (MTSO) 28. Although only three cells 24 are shown in FIG. 1, a typical cellular network may include hundreds of cells, may include more than one MTSO, and may serve thousands of radiotelephones.

The cells 24 generally serve as nodes in the communication system 20, from which links are established between radiotelephones 22 and the MTSO 28, by way of the base stations 26 serving the cells 24. Each cell 24 typically has allocated to it one or more dedicated control channels and one or more traffic channels. A control channel is a dedicated channel used for transmitting cell identification and paging information. The traffic channels carry the voice and data information. Through the cellular network 20, a duplex radio communication link may be effected between two mobile terminals 22 or between a mobile terminal 22 and a landline telephone user 32 through a public switched telephone network (PSTN) 34. The function of a base station 26 is to handle radio communication between a cell 24 and mobile terminals 22. In this capacity, a base station 26 functions as a relay station for data and voice signals.

Figure 2:
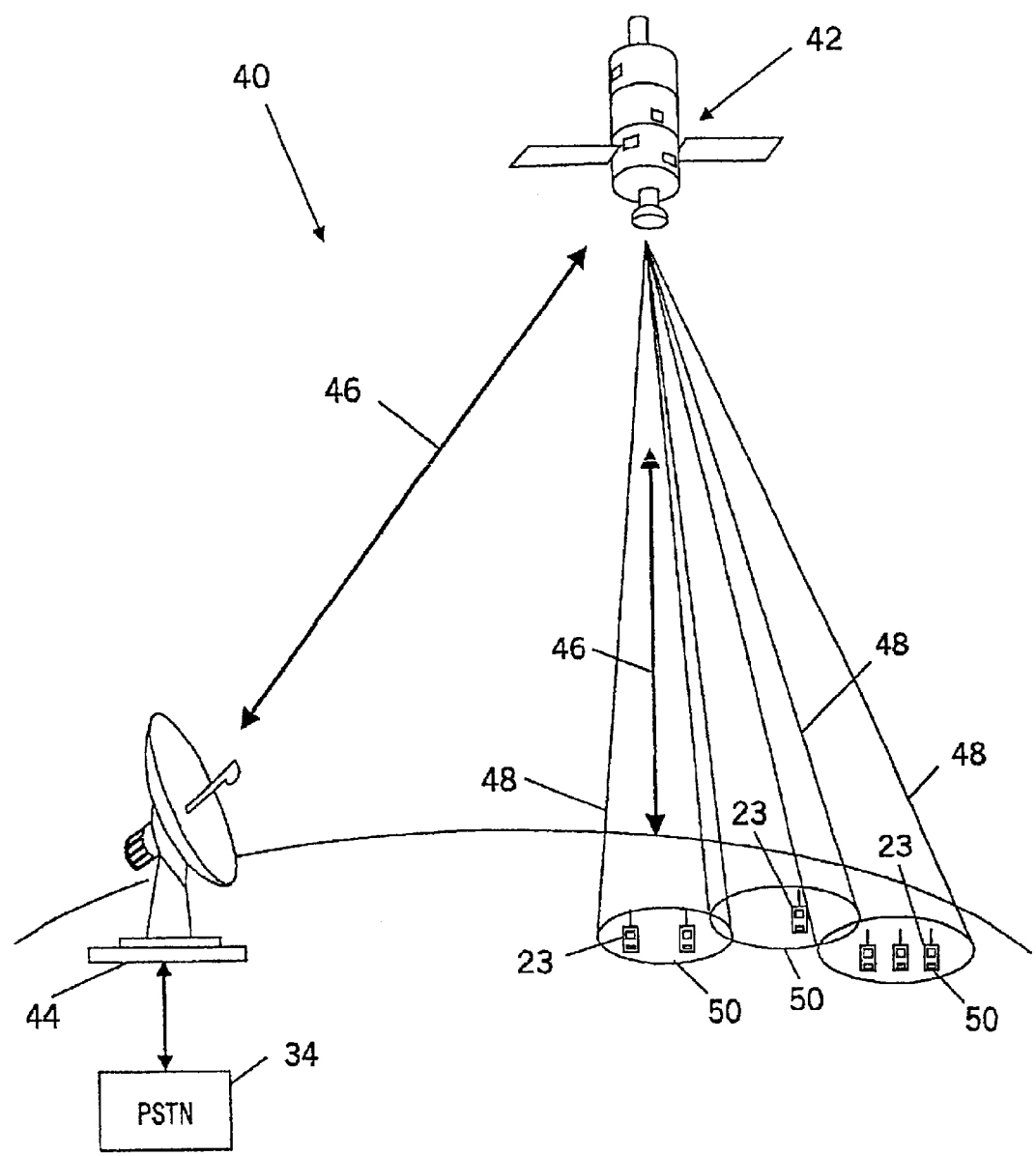
FIG. 2 is a schematic diagram illustrating a conventional satellite based wireless communications system.

As illustrated in FIG. 2, a satellite 42 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 40 typically includes one or more satellites 42 that serve as relays or transponders between one or more earth stations 44 and terminals 23. The satellite conveys radiotelephone communications over duplex links 46 to terminals 23 and an earth station 44. The earth station 44 may in turn be connected to a public switched telephone network 34, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 48, each serving distinct geographical coverage areas 50 in the system's service region. The coverage areas 50 serve a similar function to the cells 24 of the terrestrial cellular system 20 of FIG. 1.

Figure 3:
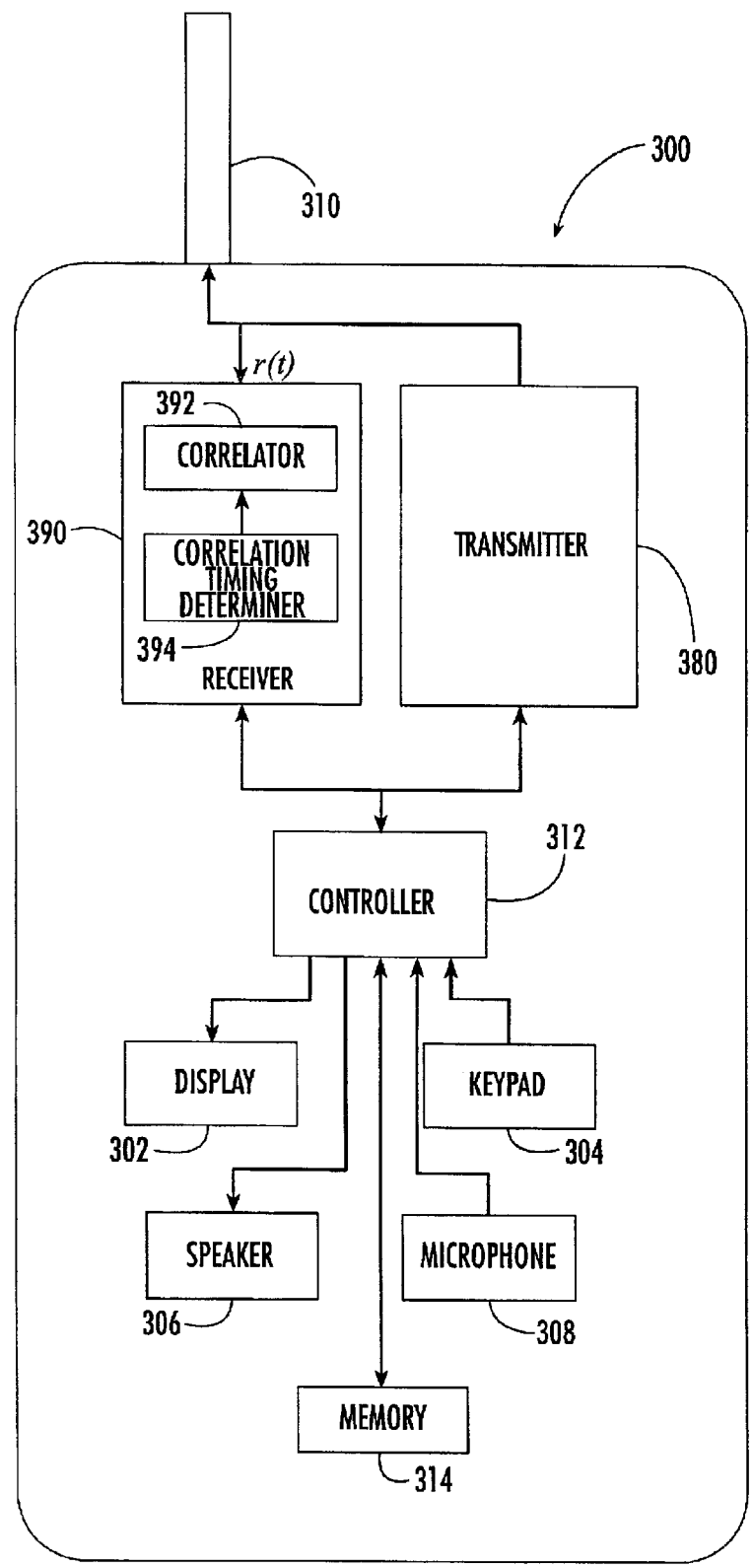
FIG. 3 is a schematic diagram illustrating a wireless terminal according to embodiments of the present invention.

FIG. 3 illustrates an exemplary wireless terminal 300, e.g., a terminal for use in a wireless CDMA communications system, according to embodiments of the present invention. The terminal 300 includes a controller 312, such as a microprocessor, microcontroller or similar data processing device, that executes program instructions stored in a memory 314, such as a dynamic random access memory (DRAM), electrically erasable programmable read only memory (EEPROM) or other storage device. The controller 312 is operatively associated with user interface components such as a display 302, keypad 304, speaker 306, and microphone 308, operations of which are known to those of skill in the art and will not be further discussed herein. The controller 312 also controls and/or monitors operations of a radio transmitter 380 that, for example, transmits radio frequency (RF) signals in a communications medium via an antenna 310.

The controller 312 is also operatively associated with a receiver 390. The receiver includes a correlation unit 392 that is operative to correlate a signal r(t) received via the antenna 310 with a particular modulation sequence, for example, a scrambling or spreading sequence. As described herein, the correlation unit 392 performs these correlations at correlation times, (e.g., delays), that are determined by a correlation timing determiner 394. Further discussion of operations for selecting correlation times, as well as further discussion of various components of the receiver, is provided herein.

It will be appreciated that the receiver 390 and other components of the terminal 300 may be implemented using a variety of hardware and software. For example, portions of the receiver 390, including the correlation unit 392 and correlation timing determiner 394, may be implemented using special-purpose hardware, such as an application specific integrated circuit (ASIC) and programmable logic devices such as gate arrays, and/or software or firmware running on a computing device such as a microprocessor, microcontroller or digital signal processor (DSP). It also will be appreciated that although functions of the receiver 390 may be integrated in a single device, such as a single ASIC, they may also be distributed among several devices. Further, it will be appreciated that the receiver could be implemented at a base station or other terminal as well as in the mobile terminal depicted in FIG. 3.

Pursuant to embodiments of the present invention, finger delays for generalized-RAKE (G-RAKE) and interference whitening-RAKE (IW-RAKE) receivers may be selected so as to suppress both own-cell and other-cell interference. In particular, the-RAKE receiver may be designed to use "probing" fingers to probe the noise correlation, specifically including the noise correlation due to own-cell and other-cell interference. Based on the knowledge of the noise temporal correlation provided by the probing fingers, a sub-set of the probing finger time offsets may be selected for traffic correlation and (weighted) combination to provide an optimized decision metric. By selecting the time-offsets for the combining fingers based on the optimization of a performance metric, it may be possible to achieve a more robust system, that is less impacted by the effects of estimation errors.

Pursuant to specific embodiments of the present invention, methods of recovering information encoded in a spread spectrum signal transmitted according to a spreading sequence in a communications medium are provided, in which at least one multipath version of a composite signal including the spread spectrum signal is received from the communications medium. Time-offset versions of this composite signal may then be generated at respective time offsets that are selected based on the time-offsets between received multipath versions of the composite signal. These time-offset versions of the composite signal may then be correlated with the spreading sequence to produce a plurality of time-offset correlations of the composite signal with the spreading sequence. A subset of these time-offsets may then be selected for combining, and a weighted combination of the correlations corresponding to the selected time-offsets may be used to estimate information encoded in the transmitted spread spectrum signal.

In certain embodiments of the invention, the time-offsets selected may include time-offsets corresponding to the times at which multipath versions of the composite signal are received. The selected time-offsets may further include time-offsets a distance d in time from the times at which multipath versions of the composite signal are received. In still other embodiments, the time-offsets selected may include time-offsets at integer multiples of a distance d in time from the times at which multipath versions of the composite signal are received. In these embodiments, d may be an integer multiple of one quarter the value of the modulation chip period of the spread spectrum signal. The time-offsets selected may also include time-offsets at intervals shifted both forward and backwards in time from the times at which multipath versions of the composite signal are received by the differential delay between two multipath signals received from an interference source. In soft-handoff situations, the time-offsets selected may further include time-offsets corresponding to the times at which multipath versions of a second composite signal are received, or shifts of those times.

In still other embodiments of the present invention, the act of selecting a subset of the plurality of time-offsets for combining may comprise (i) determining performance metrics associated with each of a plurality of subsets of the plurality of time-offsets and (ii) selecting for combining purposes one of the plurality of the subsets of the plurality of time-offsets having a performance metric meeting a predetermined criterion. In certain of these embodiments, only subsets of the plurality of time-offsets having a specified number of members are considered. In these embodiments, the specified number of members may be predetermined, may be determined as a function of the number of multipaths of the composite signal received, or may be adaptively selected based on the improvement in the value of the performance metric provided by successive increases in the number of members. The performance metric selected may be a variety of parameters, such as signal-to-noise ratio.

In embodiments of the present invention, the performance metric associated with a given subset of the plurality of time-offsets may be determined using a variety of techniques, including a brute-force search, a constrained brute-force search, an ordered, search, and/or a constrained ordered search. In the constrained searches, the subsets considered for combining are typically constrained to include some number of time-offsets that correspond to the times at which certain multipaths of the composite signal are received.

In still other embodiments of the present invention, the weights used to form the weighted combination may be generated based on information regarding the noise correlation between the time-offset correlations of the composite signal and the estimated net channel response of the time-offset correlations of the composite signal. In these embodiments, the information regarding the noise correlation between the time-offset correlations of the composite signal may comprise a noise covariance matrix, and the off-diagonal elements in the noise correlation matrix may be modified to reduce estimation noise.

Figure 4:
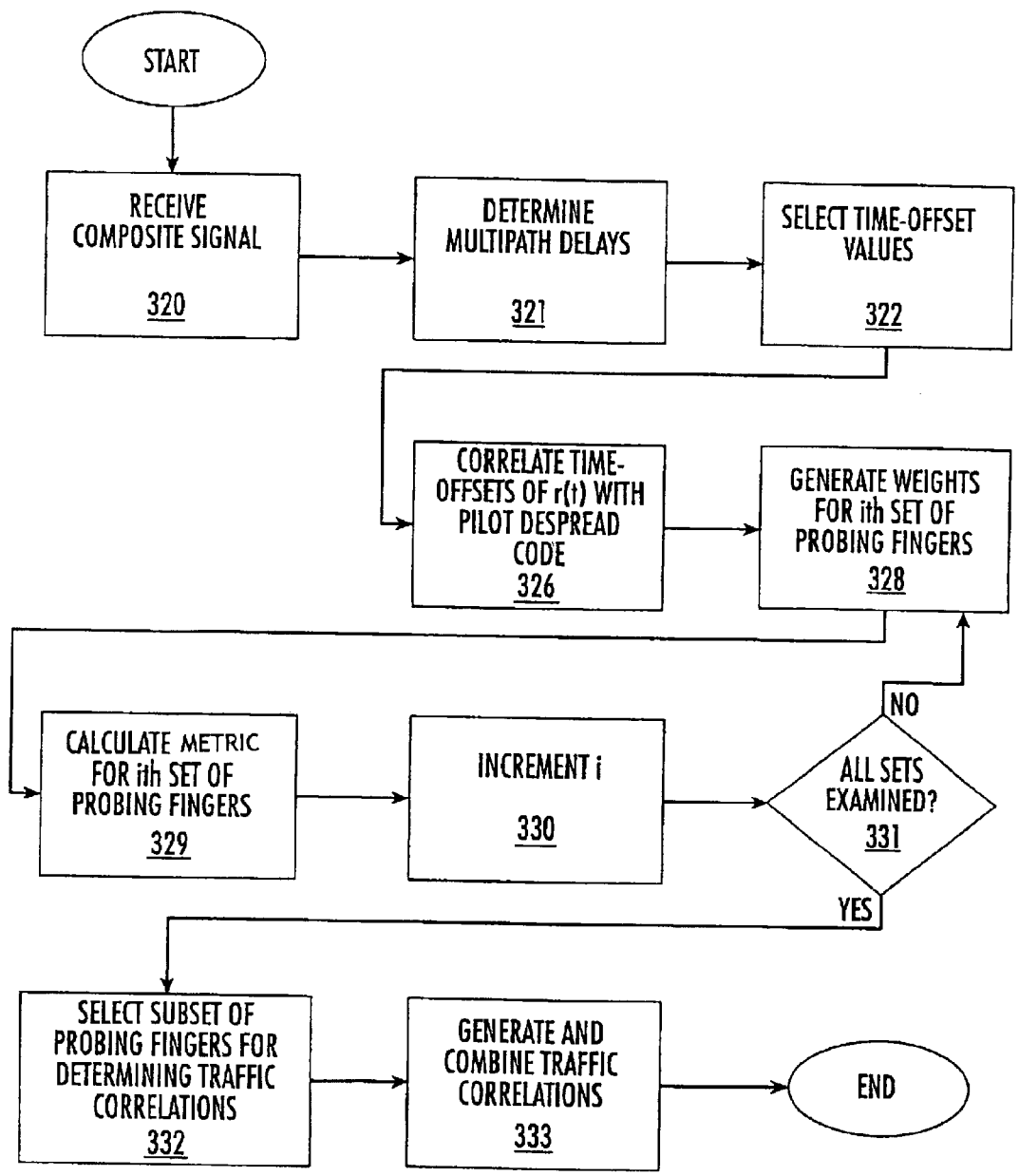
FIG. 4 is a flow chart illustrating operations for selecting and combining RAKE receiver finger delays according to embodiments of the present invention.

FIG. 4 illustrates operations for receiving and processing a composite signal according to embodiments of the present invention. As shown in FIG. 4, operations commence with the reception of a composite signal that includes a spread spectrum signal from the communications media (block 320). This composite signal is then analyzed to determine the location of the multipaths of the desired signal (block 321), using methods that are well known to those of skill in the art. A total of K delay values may then be selected which correspond to the time-offsets of the received signal that will be used in the pilot channel correlation process at the receiver (block 322). These delay values may be expressed as $\tau_0, \tau_1, \ldots, \tau_{K-1}$. The receiver may then correlate r(t) with the pilot channel despreading code (which typically is the conjugate of the chip sequence used to spread the pilot signal) using the time-offsets, to produce a series of K despread values $X_0, X_1, \ldots, X_{K-1}$ (block 326). Note that, herein, the term "probing finger" is used to denote such time-offsets or time-offset correlations of the received signal r(t) (or the magnitude of the time offset correlations, depending upon the context of the usage). Moreover, herein discussion of combining "probing fingers" refers to performing a weighted combination of a set of time-offset versions of r(t) that have been correlated with the traffic channel despreading code. Note that with multicode transmission, correlation to multiple traffic channel codes may be needed.

Once the series of K despread values are produced at block 326, operations may then be performed to select a set of $K_c$ of the probing fingers which will determine the time-offsets used for traffic channel correlations. These traffic channel correlations will be combined using a weighted combiner to provide a decision variable as to the information contained within the spread spectrum signal. The set of $K_c$ of the probing fingers may be selected by generating a set of weights (block 328) for each of the different combinations of $K_c$ probing fingers and using these weights to calculate a metric (block 329) for each such combination (blocks 330, 331). Note, the weight generation process typically includes channel estimation and noise correlation estimation. A particular combination of probing fingers is then selected and used to determine time-offsets for traffic channel correlation and combining (block 332), which is typically the set having a weighted combination that optimizes the metric. The corresponding set of traffic channel correlations (i.e., the set of traffic channel correlations having the same time-offsets) is then combined in the weighted combination to provide a decision statistic (block 333).

Figure 5:
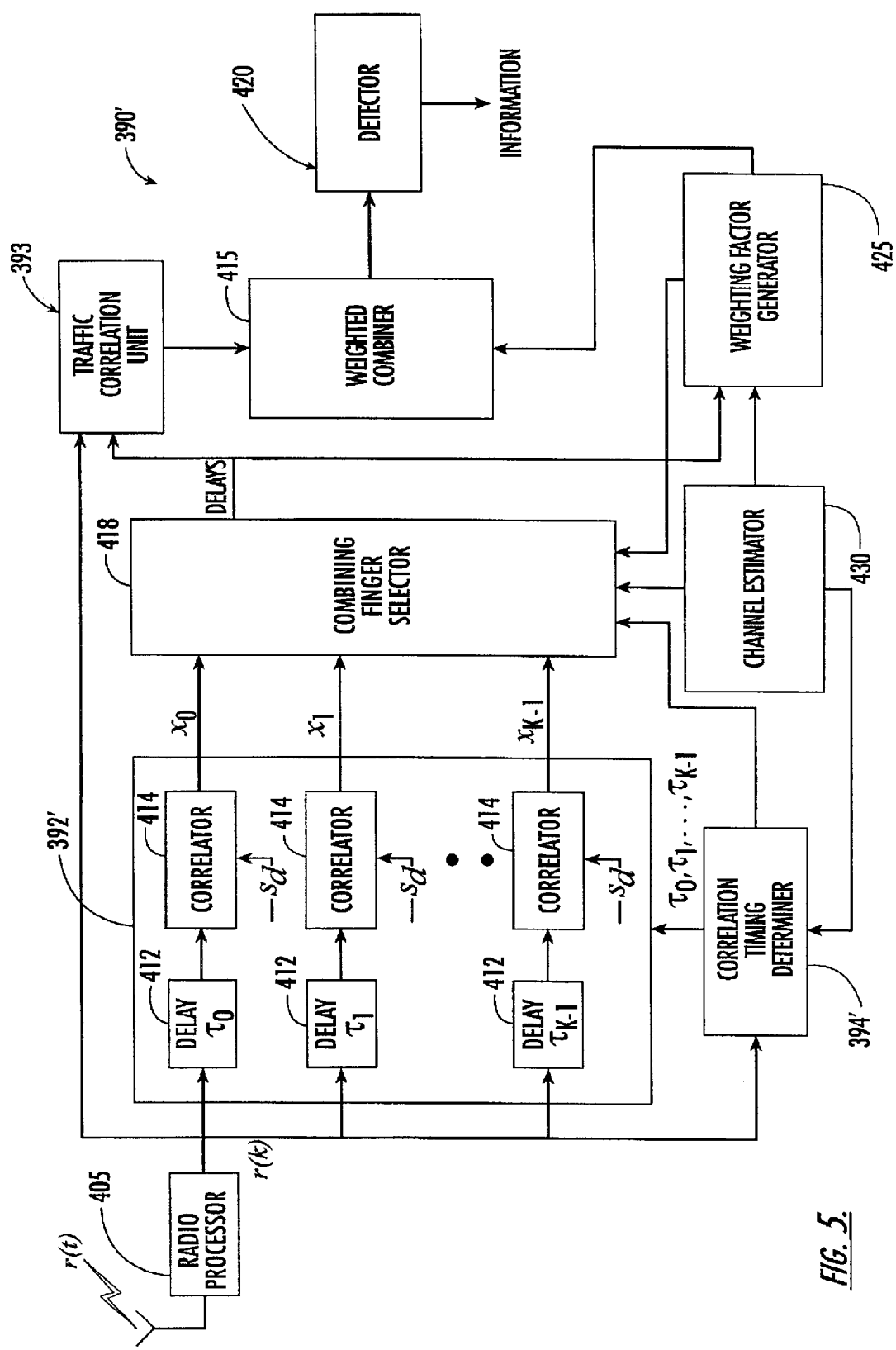
FIG. 5 is a schematic diagram illustrating a G-RAKE receiver according to embodiments of the present invention.

FIG. 5 illustrates a correlation receiver 390' that may be used to carry out the operations of FIG. 4 according to embodiments of the present invention. The receiver of FIG. 5 is an interference rejection combining (IRC) RAKE receiver, which is now more commonly referred to as a generalized-RAKE or "G-RAKE" receiver. Such G-RAKE receivers are also described in U.S. patent application Ser. No. 09/344,899 to Wang et. al., filed Jun. 25, 1999, and in U.S. patent application Ser. No. 09/165,647 to Bottomley, filed Oct. 2, 1998, each of which is assigned to the assignee of the present invention and incorporated by reference herein in its entirety.

In FIG. 5, the receiver 390' recovers information represented by a spread spectrum signal transmitted according to a desired spreading sequence $S_d$ from a composite signal r(t) received from a communications medium. The receiver 390' includes means for receiving the composite signal r(t), for example, a radio processor 405 that performs such operations as amplifying the signal r(t), and mixing, filtering and producing baseband samples r(k) of the received signal r(t). It will be appreciated that the radio processor 405 may perform a variety of other functions as well.

A pilot correlation unit 392', here shown as a bank of delays 412 linked to a bank of correlators 414, correlates delayed versions of the baseband signal r(k) to the pilot channel spreading sequence at K correlation times, $\tau_0, \tau_1, \ldots, \tau_{K-1}$. It will be appreciated that the correlation unit 392' may be implemented in various other forms, for example, by using a sliding correlator or by controlling the start and stop times of the correlators to eliminate any need for the delay units 412. Time-offsets of the despreading code are used by the correlators. Operations and criteria by which the correlation timing determiner 394' may determine the correlation times $\tau_0, \tau_1, \ldots, \tau_{K-1}$ are discussed in further detail herein.

The correlation timing determiner 394' also provides the delay values $\tau_0, \tau_1, \ldots, \tau_{K-1}$ to a combining finger selector 418. The combining finger selector 418 is used to select a subset of the probing finger delays or time-offsets for combination. The combining finger selector 418 is responsive to the values $X_0, X_1, \ldots, X_{K-1}$ provided by correlation unit 392', correlation timing determiner 394', a weighting factor calculator 425 and a channel estimator 430. As discussed in detail below, a variety of techniques may be used to select a subset of the probing fingers for traffic correlation and combination, including various constrained and unconstrained brute-force searches and/or constrained and unconstrained ordered searches.

Once a subset of the probing fingers have been selected, the corresponding delays are used in a traffic correlation unit 393 to produce despread values for the traffic channel. The traffic despread values (produced by traffic correlation unit 393) corresponding to the selected probing fingers are combined in a weighted combiner 415. The weighting factors calculated for the selected time-offsets generated by weighting factor generator 425 are also input into weighted combiner 415. Additionally, other information, such as the statistical properties of the desired spreading sequence $S_d$ and information about power of other spread spectrum signals included in the composite signal r(t) may also be taken account in generation of the weighting factors. The weighted combiner 415 produces a decision statistic that may then be used by a detector 420 to estimate information represented by the originally transmitted spread spectrum signal corresponding to the desired spreading sequence $S_d$. The detector 420 may, for example, employ soft decision decoding, such as convolutional or turbo decoding.

It will be appreciated that the receiver 390' of FIG. 5 may be implemented in a number of different ways. Although the description herein refers to employment of the receiver 390' in a mobile or other terminal that is operative to communicate with a base station of a wireless communications system, the receiver 390' can be implemented in a number of other forms including, but not limited to, receivers used in cellular base station transceivers, satellite transceivers, wireline transceivers, and other communications devices. The pilot correlation unit 392', traffic correlation unit 393, correlation timing determiner 394', weighted combiner 415, combining finger selector 418, weighting factor generator 425, detector 420 and other components of the receiver 390' may be implemented using, for example, an application-specific integrated circuit (ASIC), digital signal processor (DSP) chip or other processing device configured to perform the described processing functions. It will also be understood that, in general, components of the receiver 390' may be implemented using special-purpose circuitry, software or firmware executing on special or general-purpose data processing devices, or combinations thereof.

Figure 6:
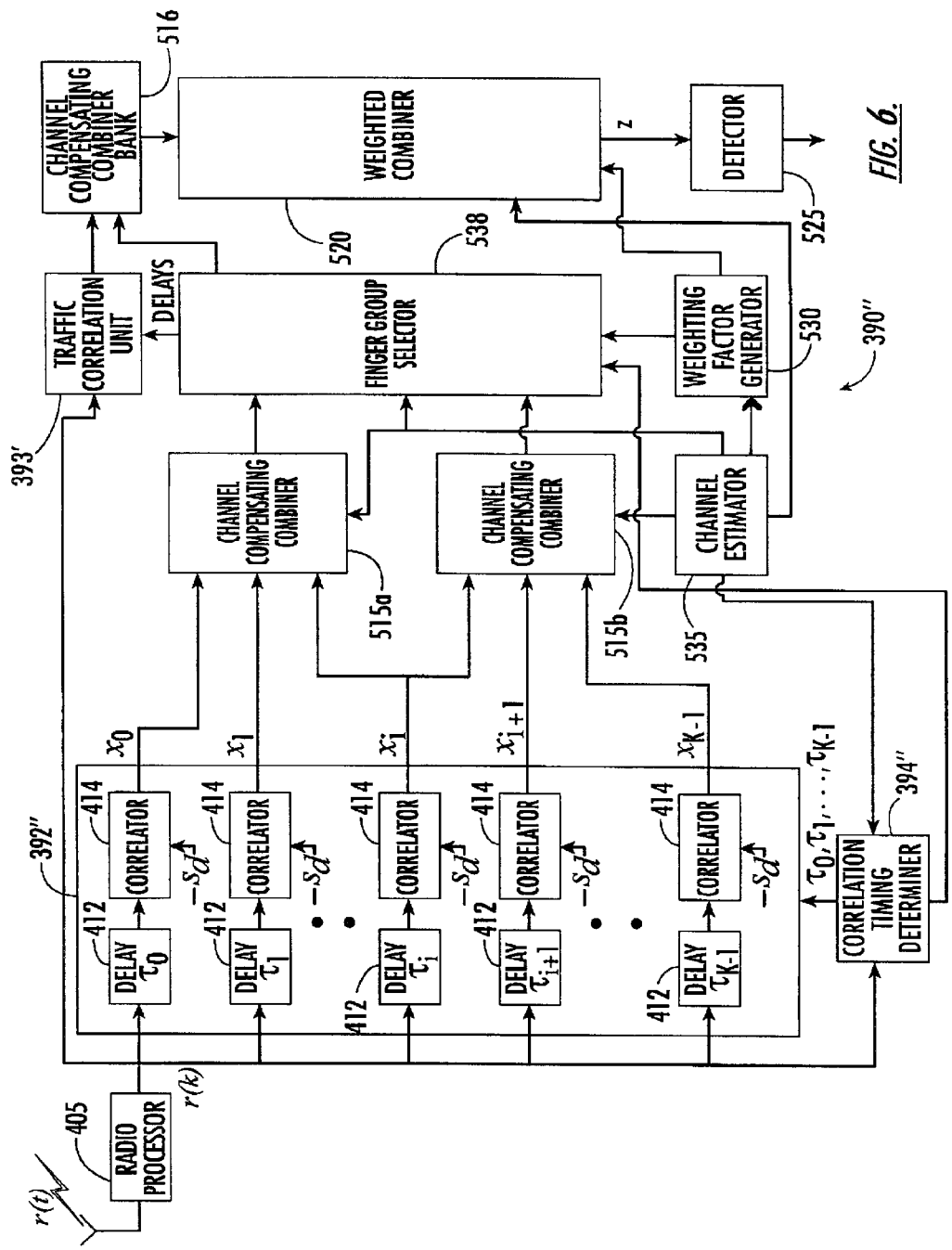
FIG. 6 is a schematic diagram illustrating an interference whitening (IW) RAKE receiver according to embodiments of the present invention.

FIG. 6 illustrates a receiver 390" according to another embodiment of the present invention, more particularly, a multistage interference whitening (IW) RAKE receiver as described in the aforementioned U.S. patent application Ser. No. 09/344,898 to Bottomley et. al, filed Jun. 25, 1999, and incorporated by reference herein in its entirety. The receiver 390" recovers information represented by a spread spectrum signal transmitted according to a desired spreading sequence $S_d$ from a composite signal r(t) received from a communications medium. The receiver 390" includes means for receiving the composite signal r(t), for example, a radio processor 405 that performs such operations for example, as amplifying the signal r(t), mixing, filtering and producing baseband samples r(k) of the received signal r(t). It will be appreciated that the radio processor 405 may perform a variety of other functions as well.

A pilot correlation unit 392", here shown as a bank of delays 412 linked to a bank of correlators 414, correlates delayed versions of the baseband signal r(k) to the desired spreading sequence $S_d$ at correlation times $\tau_0, \tau_1, \ldots, \tau_{K-1}$. The correlation unit 392" may be implemented in many other forms, such as by using a sliding correlator. The correlation times $\tau_0, \tau_1, \ldots, \tau_{K-1}$ are determined by a correlation timing determiner 394". Operations and criteria by which the correlation timing determiner 394" may determine the correlation times $\tau_0, \tau_1, \ldots, \tau_{K-1}$ are discussed in further detail herein.

Respective first and second groups of despread values $X_0, X_1, \ldots, X_i, X_i, X_{i+1}, \ldots, X_{K-1}$ produced by the correlation unit 392" are combined in respective first and second combiners 515a, 515b, here shown as channel compensating combiners that combine the correlations according to channel coefficients estimated by the channel estimator 535. As used herein, "channel compensating" combining generally refers to combining operations that include the use of channel coefficients, including, but not limited to, operations that match a channel response as used in a RAKE combiner. It will be appreciated that the channel estimator 535 may estimate channel coefficients in a number of different ways, for example, by estimation from pilot symbols (e.g., in a pilot or other channel) or recovered data symbols. Such techniques are known to those skilled in the art and will not be described in further detail herein. It will also be appreciated that although only two channel compensating combiners are shown, more may be provided, wherein each group of correlations that are fed into a particular channel compensating combiner are offset by a group offset from the correlations input to the other channel compensating combiners.

The output from the first stage combiners 515a, 515b are input into finger group selector 538. Finger group selector 538 compares various weighted combinations of the inputs from the first stage combiners 515a, 515b to determine a set of inputs that optimizes a decision metric such as signal-to-noise ratio. Potential methods of selecting such a subset of the inputs are discussed below. Once a set is selected, they determine the delays used in traffic correlation unit 393' and the groups used in the channel compensating combiner bank 516, which combine the traffic channel correlators. These results are provided to a weighted combiner 520 that combines the specified set of inputs according to weighting factors generated by a weighting factor generator 530.

Assuming BPSK modulation is used, the combining operations performed by the weighted combiner 520 may be expressed as:

$$z = Re\{w^H y\} \quad (1)$$

where z is the decision statistic produced by the combiner 520, w and y are vectors representing the weighting factors and the output of combining finger selector 538, respectively, and Re { } denotes the real part of the argument. If QPSK modulation is used, the imaginary part is also computed.

The combiner 520 produces the decision statistic z that may be used by a detector 525 to estimate information represented by the originally transmitted spread spectrum signal corresponding to the desired spreading sequence $S_d$. The detector 525 may, for example, implement soft decision decoding, such as convolutional decoding or turbo decoding. As discussed in more detail herein, the weighting factor generator 530 may generate the weighting factors in a number of different ways, including by explicit calculation from an estimated composite channel response and an estimated impairment correlation, or by adaptive filtering techniques.

It will be appreciated that the receiver 390" of FIG. 6 may be implemented in a number of different ways. Although the description herein refers to employment of the receiver 390" in a mobile or other terminal that is operative to communicate with a base station of a wireless communications system, the receiver 390" can be implemented in a number of other forms including, but not limited to, receivers used in cellular base station transceivers, satellite transceivers, wireline transceivers, and other communications devices. The pilot correlation unit 392", traffic correlation unit 393', correlation timing determiner 394", combiners 515a, 515b, 516, 520, channel estimator 535, combining finger selector 538, weighting factor generator 530, detector 525 and other components of the receiver 390" may be implemented using, for example, an application-specific integrated circuit (ASIC), digital signal processor (DSP) chip or other processing device configured to perform the described processing functions. It will also be understood that, in general, components of the receiver 390" may be implemented using special-purpose circuitry, software or firmware executing on special or general-purpose data processing devices, or combinations thereof.

Selection of Probing Finger Locations

Aspects of the present invention arise from the realization that in many cellular telephone systems operating under DS-CDMA, the frame error rate performance of a G-RAKE or IW-RAKE receiver may be more limited by other-cell interference than by own-cell interference. Consequently, prior techniques that are aimed at reducing or eliminating own-cell interference by, for example, determining impairment (noise plus interference) properties of the received composite signal using knowledge of the spread spectrum signals in the composite signal so that weighting factors may be generated such that in the combining process the interference and noise components are suppressed, may provide less than optimal limited improvement in frame error rate performance. Pursuant to the teachings of the present invention, it will be understood that probing fingers may be used to probe the noise correlation (specifically including both own-cell and other-cell interference noise components) to obtain information which may then be used to select a subset of the probing fingers for a weighted combination that maximizes a selected performance metric.

Figure 7:
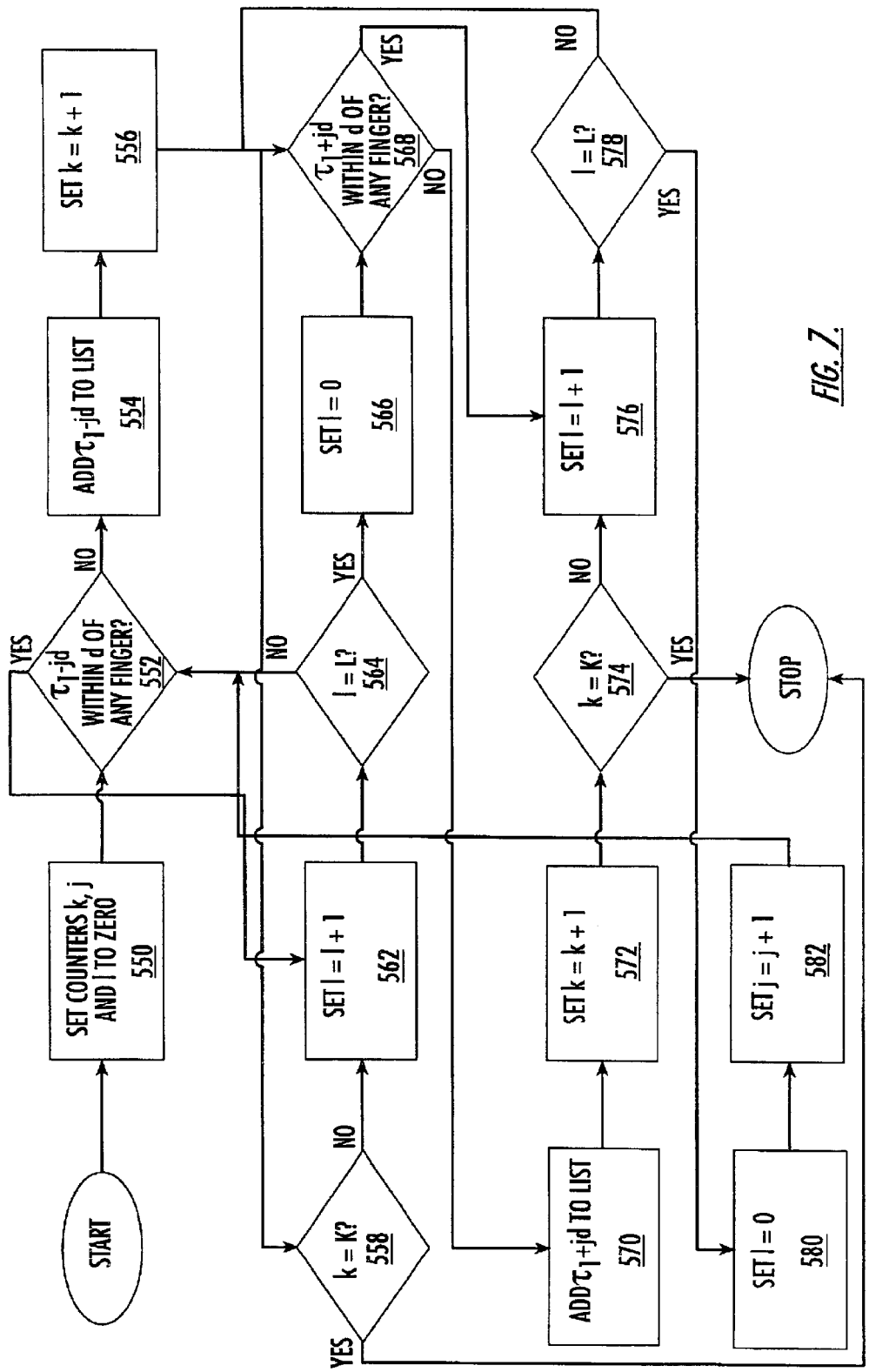
FIG. 7 is a flow chart illustrating operations for selecting probing fingers according to embodiments of the present invention.

FIG. 7 illustrates operations for selecting the location of the probing fingers according to one embodiment of the present invention. In FIG. 7, K represents the number of probing fingers which are to be used, L represents the number of multipaths of the composite signal r(t) that are received at the receiver, and $\tau_0, \tau_1, \ldots, \tau_{L-1}$ are the delays associated with the respective multipaths of the received composite signal. These delays $\tau_l$ are ordered based on the signal strengths of the multipath signals, with $\tau_0$ corresponding to the strongest multipath, $\tau_1$ to the next strongest and so forth. A minimum spacing between probing fingers d may also be selected. In certain embodiments of the present invention, the minimum spacing is set as $d=T_c/2$ or as $d=3T_c/4$, where $T_c$ is the modulation chip period. However, those of skill in the art will appreciate that other minimum spacings may be used. Generally, the choice of d depends on the chip pulse shape and corresponding bandwidth.

As indicated in FIG. 7, the operations for selecting the probing fingers according to one embodiment of the present invention start by setting three counters, k,j and l, to zero (block 550). Then, it is determined whether $\tau_l-jd$ is within the interval d of any previously selected probing finger (block 552). Since at this point, no probing fingers have been selected, a probing finger is established at $\tau_0$ (as both l and j are equal to zero), meaning it is "added" as the first entry in the list of probing fingers (block 554). The counter k, which tracks the number of probing fingers in the list, is then incremented by one (such that k=1) (block 556). So long as k is less than K (block 558), the counter l is incremented by one (block 562). If counter l is less than L (the number of multipaths) (block 564), operations resume at block 552.

So long as K>L, which will typically be the case as it is usually advantageous to include more probing fingers than there are multipaths of the composite signal, the operations of blocks 552 through 564 will result in adding probing fingers at times $\tau_0, \tau_1, \ldots, \tau_{L-1}$ (i.e., at the times of each multipath) to the list of probing fingers, so long as each multipath is separated from adjacent multipaths by at least d. Once at block 564 the counter l=L, counter l is reset to zero (block 566). Since at this point both l and j are zero, $\tau_l-jd=\tau_0$, and thus is within the interval d of one of the fingers ($\tau_0$) on the list at the test of block 568. Consequently, operations proceed to block 576 where counter l is incremented by one. Operations continue looping through blocks 568, 576 and 578 until counter l=L (as each of the probing fingers $\tau_0, \tau_1, \ldots, \tau_{L-1}$ have already been added to the list).

Once counter l=L at block 578, counter l is reset to zero (block 580), and j is incremented by one (block 582). Operations then continue at block 552, except that j is now equal to one. The operations of blocks 552 through 564 will then result in probing fingers being added to the list of probing fingers at $\tau_0-d, \tau_1-d, \ldots, \tau_{L-1}-d$, to the extent probing fingers at such locations are not within d of any probing finger currently on the list, and to the extent K probing fingers have not already been added to the list. Once counter l=L at block 564, counter l is reset to zero (block 566), and then the operations of blocks 568 through 578 proceed to add probing fingers at times $\tau_0+d, \tau_1+d, \ldots, \tau_{L-1}+d$ to the list, to the extent probing fingers at such locations are not within d of any probing finger currently on the list, and to the extent K probing fingers have not already been added to the list. Once counter l=L at block 578, counter l is reset to zero (block 580), and j is incremented by one (block 582). Operations then proceed at block 552 as described above. This will result in the placement of probing fingers at $\tau_0-2d, \tau_1-2d, \ldots, \tau_{L-1}-2d$, and then at $\tau_0+2d, \tau_1+2d, \ldots, \tau_{L-1}+2d$, and then at $\tau_0-3d, \tau_1-3d, \ldots, \tau_{L-1}-3d$, and then at $\tau_0+3d, \tau_1+3d, \ldots, \tau_{L-1}+3d$ and so forth until the number of probing fingers in the list equals K. Probing fingers, however, are not added, if they would be within the distance d of any probing finger already on the list.

Figure 8:
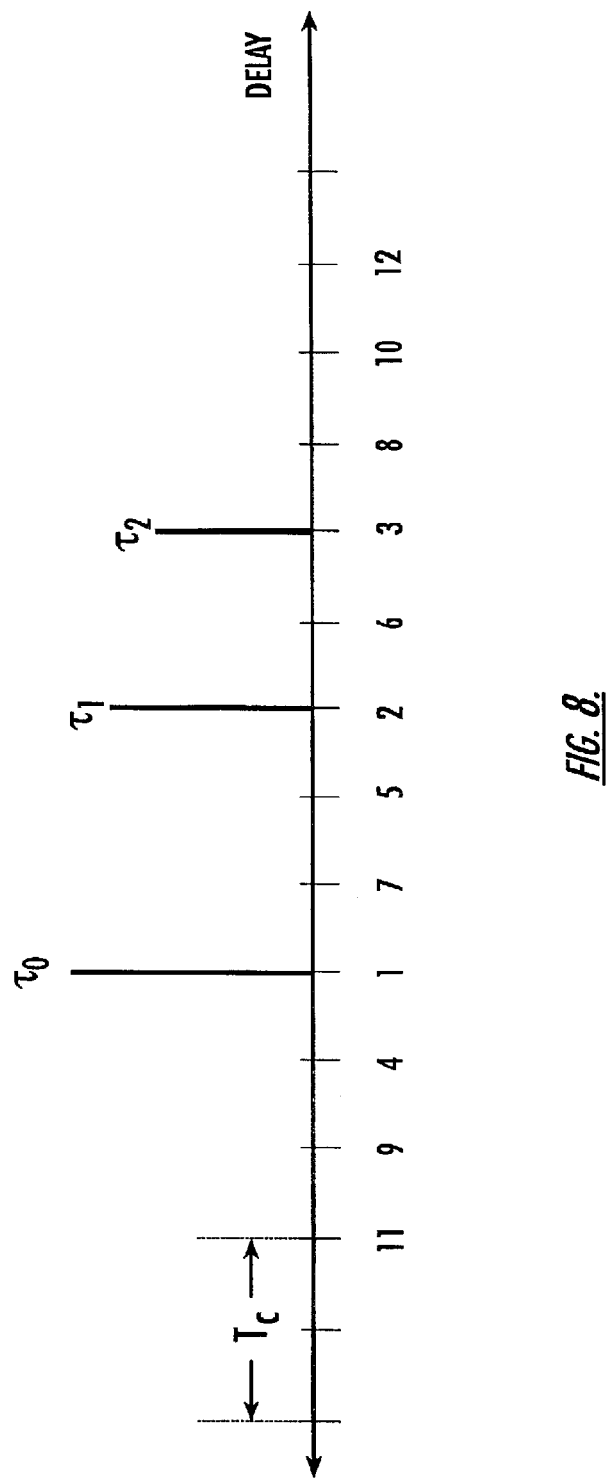
FIG. 8 is a schematic diagram illustrating the order in which probing fingers are selected in an exemplary embodiment of the present invention.

FIG. 8 illustrates an example of probing finger selection according to the operations of FIG. 7. In FIG. 8, it is assumed that there are three multipaths (i.e., L=3) which are located at times $\tau_0$, $\tau_1$, and $\tau_2$, that the number of probing fingers will be twelve (i.e., K=12), and that $d=T_c/2$. The horizontal axis in FIG. 8 represents time. The numbers below the horizontal axis indicate the location (in time) at which the twelve probing fingers will be specified according to the operations of FIG. 7, and the order in which they will be added to the list of probing fingers. Thus, FIG. 8 shows that probing fingers will first be added at (1) $\tau_0$, (2) $\tau_1$, and (3) $\tau_2$, followed by probing fingers at times (4) $\tau_0-d$, (5) $\tau_1-d$, (6) $\tau_2-d$ and (7) $\tau_0+d$. However, when the algorithm reaches $\tau_1+d$, a probing finger is already present (as $\tau_1+d$ is identical to $\tau_2-d$), so an additional probing finger is not added to the list. The operations of FIG. 7 then continue, adding probing fingers to the list at times (8) $\tau_2+d$, (9) $\tau_0-2d$, (10) $\tau_2+2d$, (11) $\tau_0-3d$ and (12) $\tau_2+3d$.

An alternative methodology for selecting probing fingers is to first place a probing finger at each of the L delay values $\tau_0, \tau_1, \ldots, \tau_{L-1}$ that correspond to the respective multipaths of the received composite signal. As with the methodology of FIG. 7, the first probing finger is assigned to the strongest multipath, and the assignments continue in the order of decreasing multipath signal strength. Then instead of placing probing fingers at $\tau_0-d, \tau_1-d, \ldots \tau_{L-1}-d$ before placing probing fingers on the "+d" side of each multipath, an alternating methodology is used where probing fingers are placed at $\tau_0-d, \tau_0+d, \tau_1-d, \tau_1+d, \tau_2-d, \tau_2+d$ and so forth. A similar methodology is used with probing fingers placed at the ±2d, ±3d, etc. offsets from each multipath.

Those of skill in the art will also appreciate that probing fingers could be selected using various modifications to the above-described approaches. For instance, in the approach of FIG. 7, probing fingers could be selected at +d intervals from each multipath before selecting probing fingers at −d intervals from each multipath. Similarly, probing fingers might be omitted at the locations corresponding to a weak multipath (and ± integer multiples of d from such a multipath). Moreover, it will be appreciated that a wide variety of other selection criteria may also be used.

In various wireless communications systems, such as systems operating under the IS-95, IS-2000 and W-CDMA standards, the mobile terminals may monitor the signal-to-interference ratio of signals from non-active base stations. Typically, sliding correlations are used to obtain the delay profiles of one or two non-active base stations that are transmitting the strongest interfering signals received by the mobile terminal. These sliding correlations may be performed using additional hardware/software at the mobile terminal, or by time sharing the hardware/software used to receive desired communications signals. These delay profiles of non-active stations may then be used in the selection of the probing finger locations. Additionally, the delay profile of at least the strongest non-active interfering base station may also be used to directly determine the delays of the combining fingers.

Figure 14:
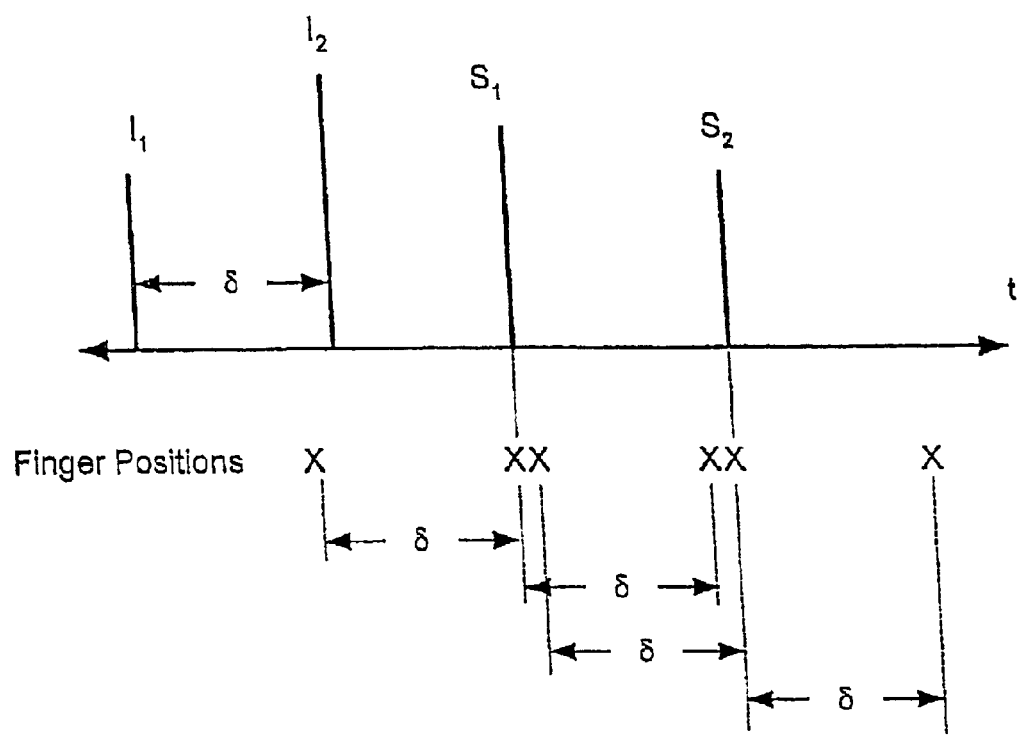
FIG. 14 is a schematic diagram illustrating the selection of the probing fingers in a modified version of the example of FIG. 13.

In particular, it may be shown that the multipath of a signal received from a non-active base station may be cancelled by placing probing fingers at intervals of $\pm\delta_i$ from each multipath from the active base station, where $\delta_i$ is the time offset or "differential delay" between any two multipaths from the non-active base stations. FIGS. 13 and 14 provide an example of how the delay profiles of such non-active base stations may be used to select additional locations for probing fingers.

FIG. 13A illustrates the times at which various multipaths are received at a mobile terminal in an exemplary scenario. As shown in FIG. 13A, two multipaths $I_1$ and $I_2$ are received from a non-active base station, and a delay of $\delta$ separates these received signals. The interfering signals $I_1$ and $I_2$ are basically identical, except for having different complex weighting due to independent Rayleigh fading. In this example a single multipath $S_1$ of the desired signal is received from the active base station.

FIG. 13B illustrates the time over which the interfering and desired signals will extend after despreading. As is apparent from FIG. 13B, both signals $I_1$ and $I_2$ overlap in time with the signal received by the finger centered on $S_1$. As a result, they will appear as interference during demodulation.

FIG. 13C illustrates how additional fingers can be used to cancel out the interference depicted in FIG. 13B. Specifically, by placing a finger at $\pm\delta$ from $S_1$ it is possible to receive the mirror image of the interference. Consequently, by optimizing the combining weights of these fingers, these mirrored images can be used to cancel the interference that is received in the output of the RAKE finger located at the location of signal $S_1$.

FIG. 14 expands upon the example of FIGS. 13A–13C to illustrate the placement of probing fingers. In the example of FIG. 14, a second multipath of the desired signal $S_2$ has been included to further illustrate finger placement. As shown in FIG. 14, in this example a finger is placed at the location of each desired multipath signal, and fingers are also placed at $\pm\delta$ from each desired multipath signal, where $\delta$ is the separation between interfering signals $I_1$ and $I_2$. A more general method to place the probing fingers in such examples as shown in FIG. 14 is to use the method in FIG. 7 with d set to the time separation $\delta$.

Selection of Probing Fingers to Control Traffic Correlation and Combining

After the probing fingers have been selected, a subset of these probing fingers may be selected for determining traffic channel correlation and combining. Four separate techniques for selecting the subset of probing fingers are described below, namely (i) an unconstrained brute-force search, (ii) a constrained brute-force search, (iii) an unconstrained ordered search and (iv) a constrained ordered search. Those of skill in the art will understand in light of the present disclosure that alternative techniques may also be used, and that various modifications may also be made to the examplary techniques disclosed herein without departing from the spirit or the scope of the present invention.

Unconstrained Brute-Force Search

Pursuant to embodiment of the present invention, the subset of the probing fingers that are to be combined are identified by an unconstrained brute-force search. For each of the different possible combinations of $K_c$ combining fingers out of the K probing fingers, an SNR metric may be calculated as:

$$SNR(i) = (h^{(i)})^H w^{(i)} \tag{2}$$

where $h^{(i)}$ is the net channel response corresponding to the $i^{th}$ combination of $K_c$ different probing fingers, and $w^{(i)}$ is the weight vector corresponding to the $i^{th}$ combination. The net channel response for a probing finger with delay $\tau$ reflects the effects of the transmit pulse shape filter and/or other elements on the transmitting end, as well as the effects of the communications medium and the response of the receive filter. This net channel response for a probing finger may be determined from the channel coefficient estimates provided by the channel estimator as follows:

$$h(\tau) = \sum_{l=0}^{L-1} g_l h_{tr}(\tau - \tau_l) \tag{3}$$

where $g_l$ is the complex channel coefficient for multipath with a delay $\tau_1$ and where $h_{tr}$ is the convolution between the transmit and receive filter responses. Thus, in the brute-force search $h^{(i)}$ is a $K_c \times 1$ vector containing the net channel response $h(\tau)$ for each of the $K_c$ probing fingers that are part of the $i^{th}$ combination of probing fingers.

The combining weights $w^{(i)}$ may be computed as:

$$w^{(i)} = (R^{(i)})^{-1} h^{(i)} \tag{4}$$

where $R^{(i)}$ is the noise covariance matrix corresponding to the $i^{th}$ combination of $K_c$ different probing fingers. The noise covariance matrix corresponding to the $i^{th}$ combination $R^{(i)}$ may include components attributable to own-cell interference, other-cell interference and thermal noise. $R^{(i)}$ is a $K_c \times K_c$ matrix which may be decomposed into four terms:

$$R^{(i)} = R^{(i)}_{ISI} + R^{(i)}_{OW} + R^{(i)}_{OT} + R^{(i)}_n \tag{5}$$

where $R^{(i)}_{ISI}$, $R^{(i)}_{OW}$, $R^{(i)}_{OT}$, and $R^{(i)}_n$ are the correlation of the inter-symbol interference, the correlation of own-cell interference, the correlation of other cell interference and correlation of additive white noise, respectively. Methods of estimating and/or computing these various elements of $R^{(i)}$ are known in the art, such as the methods disclosed in copending U.S. patent application Ser. Nos. 09/344,898 and 09/344,899, the disclosure of which are hereby incorporated by reference, and in Y. E. Wang and G. E. Bottomley, "Generalized RAKE Reception for Cancelling Interference from Multiple Base Stations," Proceedings of IEEE Vehicular Technology Conference, Boston, September 2000, and hence will not be discussed further herein.

As is clear from the above discussion, the weighting factors contained in $w^{(i)}$ take into account the statistical properties of the spreading sequences (ie., own-cell interference effects) as well as other-cell interference effects. Weighting factors $w^{(i)}$ may be continuously updated or, alternatively, can be intermittently calculated, for example, upon substantial changes in the delays and/or the channel estimates. The weights corresponding to the $i^{th}$ subset of probing fingers can be obtained by solving the equations:

$$R^{(i)} w^{(i)} = h^{(i)} \tag{6}$$

As equation (6) describes a linear system, any number of techniques for solving linear systems may be used to solve for $w^{(i)}$. In embodiments of the present invention, an iterative technique that can compute new weighting factors from already existing weights is utilized, so as to avoid the need for matrix inversion. For example, an iterative Gauss-Seidel technique may be used, where the weighting factors are calculated as:

$$w_m(k+1) = \left( h_m - \sum_{j=1}^{m-1} r_{mj} w_j(k+1) - \sum_{j=m+1}^{n} r_{mj} w_j(k) \right) / r_{mm}, \quad (7)$$

where $w_m$ is an element in the vector $w^{(i)}$ and $h_m$ is an element in the vector $h^{(i)}$. Also, n is the dimension of the vectors $w^{(i)}$ and $h^{(i)}$ (i.e., $n=K_c$) $r_{ij}$ is the $(i,j)^{th}$ element of the noise covariance matrix $R^{(i)}$, and k is the stage of iteration. If the initial guess (the values of $w^{(i)}$ in the previous stage or previous symbol period) are close to the correct solution, this iteration should converge after only one or a few iterations. Thus, in embodiments of the present invention, only two iterations are used. Initially the weighting factors $w^{(i)}$ can be set to channel coefficient estimates, corresponding to traditional RAKE combining. Alternatively, they may be set to channel coefficient estimates normalized by noise covariance values. Convergence can be accelerated by modifying the calculated $w_i(k+1)$ to:

$$w_i(k+1) = \lambda w_i(k+1) + (1-\lambda) w_i(k), \quad (8)$$

where $\lambda$ is a relaxation parameter. For $1 < \lambda \leq 2$, faster convergence may be obtained for already convergent systems, and if normal iteration is not convergent, $\lambda \leq 1$ may be used to obtain convergence. Techniques for iterative solution of linear systems are described generally in the *Handbook of Mathematics and Computer Science,* by Harris et al., published by Springer-Verlag (New York, 1998), at pp. 456–457.

Constrained Brute-Force Search

In other embodiments of the present invention, a constrained brute-force search may be used to determine which subset of the probing fingers that are combined. In this approach, probing fingers aligned with M of the multipaths are always selected for combining, where M is by definition less than or equal to L (the number of mulitpaths). The value of M may be selected based on a number of criteria, such as, for example, the absolute or relative powers of the received multipath signals. Typically, the probing fingers aligned with the M strongest multipaths are selected. The receiver then uses a brute-force search to search through the remaining K–M probing fingers for selecting the remaining ($K_c$–M) fingers for combination, using the brute-force search techniques described above. This constrained brute-force search can significantly reduce the number of combinations that must be searched.

Unconstrained Ordered Search

In other embodiments of the present invention, an unconstrained ordered search may be used to determine which subset of the probing fingers that are combined. Herein, the term "ordered search" refers to a search where selected probing fingers are determined one at a time or one-by-one. In this approach, the receiver searches through all K probing fingers to identify the probing finger which maximizes the SNR metric of Equation (2) above. This probing finger is placed in the subset of the probing fingers which are to be combined, which will be referred to as set $S_1$. The receiver then searches through the combinations of the selected probing finger and all the remaining probing fingers to identify a second probing finger which maximizes the SNR metric of Equation (2). This ordered search continues until all $K_c$ combining fingers are found. In embodiments of the present invention, the unconstrained ordered search may be halted if the SNR metric does not increase by a certain amount. This ordered search is much less complex than the brute-force searching techniques described above, yet typically provides nearly equivalent performance. The Gauss-Seidel algorithm or other linear equation solving techniques may be used to obtain the combining weights during the ordered search.

Figure 9:
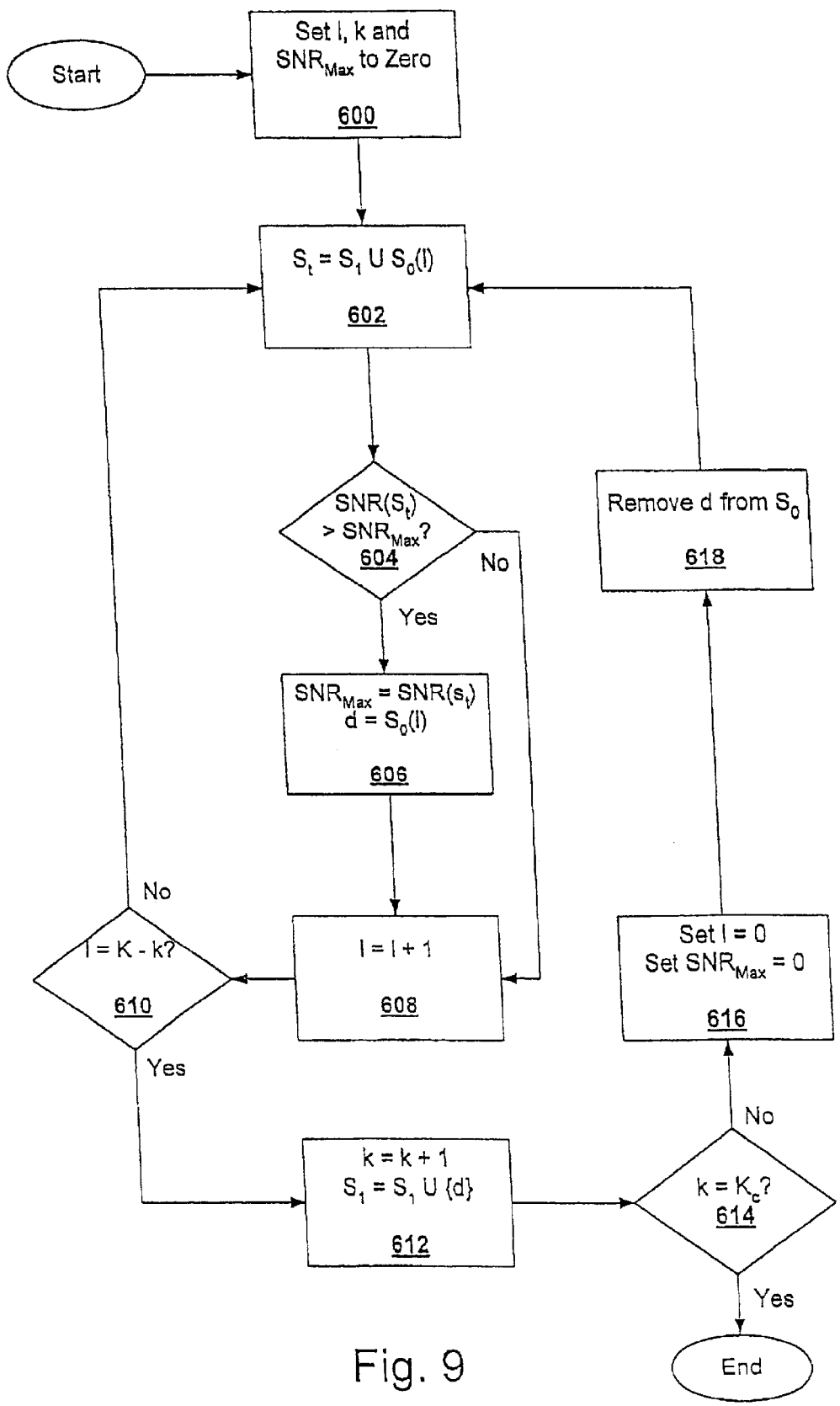
FIG. 9 is a flow chart illustrating operations for selecting the probing fingers which are to be combined using an ordered search technique according to embodiments of the present invention.

FIG. 9 depicts the operations which are performed during one type of ordered search that is used in embodiments of the present invention. As shown in FIG. 9, operations begin by setting two counters, l and k, to zero, and by setting variable $SNR_{Max}$ to zero (block 600). At this point, the set $S_1$ which contains the probing fingers that are to be combined is an empty set. A set $S_t$ is then defined as the union of set $S_1$ (which is an empty set) and the $1^{th}$ member of set $S_0$, where $S_0$ is the set of all the probing fingers numbered from probing finger 0 to probing finger K-1 (block 602). Thus, at this point in the operations $S_t$ comprises the first probing finger in set $S_0$. The SNR metric as calculated from Equation (2) for set $S_t$ is then computed and compared to $SNR_{Max}$ (block 604). As at this point $SNR_{Max}$ has been set to zero, operations continue at block 606 where $SNR_{Max}$ is set to the SNR of $S_t$ computed from Equation (2), and a variable d is fixed as $S_0(1)$ (which at this point is the first probing finger in set $S_0$ since l=0). The counter l is then incremented (block 608), and l is compared to the value K–k (block 610), where k indicates the number of entries currently in set $S_1$. Since at this point l is less than K–k, operations continue at block 602. The operations of blocks 602 through 610 are then repeated until l=K, at which point the probing finger having the highest SNR metric will have been identified. Note that during these operations if the SNR of the current probing finger is less than $SNR_{Max}$, then the operations of block 606 are skipped. In this manner, when at block 610 l equals K–k (i.e., all of the probing fingers in set $S_0$ have been searched), $SNR_{Max}$ will be equal to the SNR of the probing finger with the highest SNR, and d will identify this probing finger.

At this point, operations continue at block 612 of FIG. 9, where probing finger d is added to set $S_1$, and counter k is incremented by 1 to reflect this addition to set $S_1$. Counter k is then compared to $K_c$ (block 614). If k is less than $K_c$, operations continue by resetting both counter l and $SNR_{Max}$ to zero (block 616), and by removing probing finger d from set $S_0$ (block 618). Operations then continue at block 602 as described above, except that in this case when looping through blocks 602 through 610 set $S_t$ contains two members, and the operations identify the probing finger which in combination with the probing finger identified during the initial loops through blocks 602 through 610 maximizes the SNR metric. These operations continue as shown in FIG. 9 until k=$K_c$, at which point set $S_1$ contains the $K_c$ probing fingers which are to be used as time offsets for traffic combining fingers.

Figures 10A, 10B, 10C, 10D:
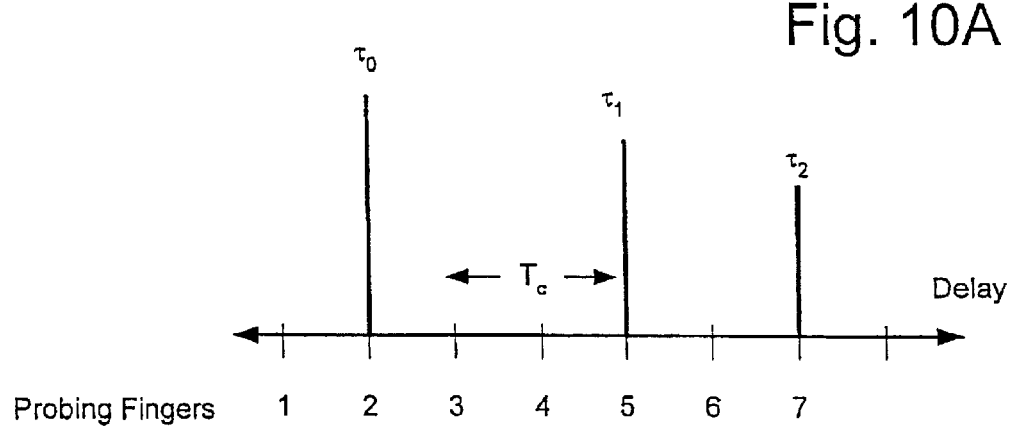
FIGS. 10A–D illustrate the selection of the probing fingers which are to be combined in an example of the ordered search techniques of FIG. 9.

FIGS. 10A–D comprise an example of an unconstrained ordered search. In this example, it is assumed that there are three multipath signals (L=3), that the number of probing fingers (K) is seven, and that the number of probing fingers which are to be combined ($K_c$) is three. As shown in FIG. 10A, seven probing fingers have been selected, at $T_c/2$ intervals starting at $\tau_0 - T_c/2$ and ending at $\tau_2$ (numbered sequentially from 1 to 7 in the figure). As shown in FIG. 10B, during the first step of the search (i.e., k=0), the operations of FIG. 9 will typically identify the probing finger corresponding to the multipath having the highest signal level (probing finger 2), and this probing finger is added to the set of probing fingers that are to be combined. Then, as shown in FIG. 10C, during the second step of the search (i.e., k=1), the SNR metric of Equation (2) for the combination of the selected probing finger and each of the remaining probing fingers is evaluated to determine which probing finger, when combined with probing finger 2, provides the highest SNR (in the case of the example of FIG. 10, probing finger 5 which is labeled as being the "best"), and probing finger 5 is added to the set of probing fingers that are to be combined. Finally, as shown in FIG. 10D, in the third step (i.e., k=2), the SNR metric of Equation (2) for the combination of probing fingers 2 and 5 with each of the remaining probing fingers is evaluated to determine which probing finger, when combined with probing fingers 2 and 5, provides the highest SNR (in the case of the example of FIG. 10, probing finger 7), and probing finger 7 is added to the set of probing fingers that are to be combined.

Constrained Ordered Search

In other embodiments of the present invention, a constrained ordered search may be used to determine which subset of the probing fingers that are combined. In this approach, the unconstrained ordered search described above is modified in that, before the search starts, the receiver identifies M probing fingers (typically the M probing fingers aligned with the strongest received signals) as combining fingers and adds them to set $S_1$. As a result, the search need only identify the remaining $K_c$–M probing fingers that are to serve as combining fingers, thus further reducing the complexity of the search. Operations according to an exemplary constrained ordered search are depicted in FIG. 11.

Figure 11:
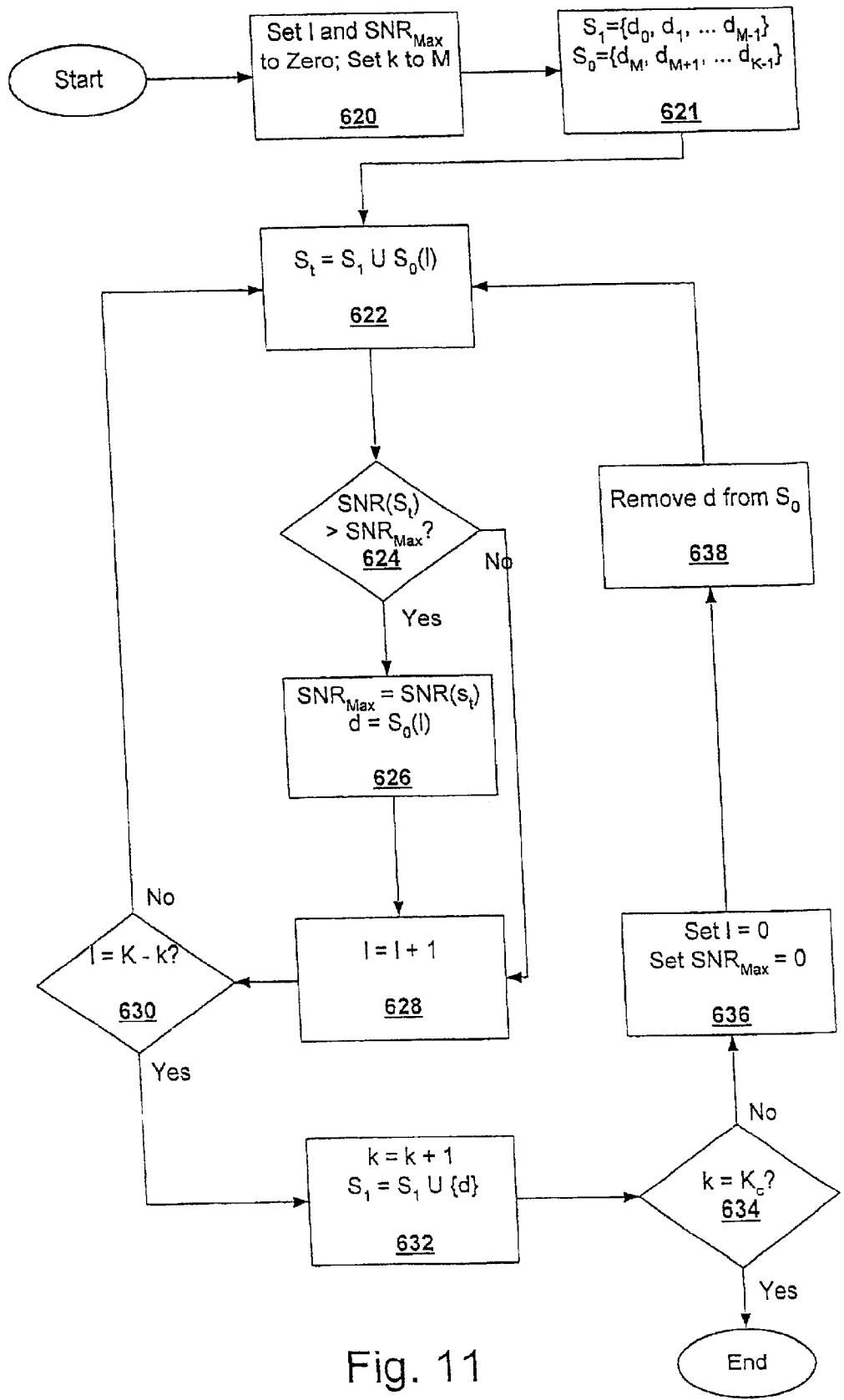
FIG. 11 is a flow chart illustrating operations for selecting the probing fingers which are to be combined using a constrained ordered search technique according to embodiments of the present invention.

Note that the operations of FIG. 11 are identical to the operations depicted in FIG. 9, except that an additional step (block 621) is included at the start of the operations. Thus, as shown in FIG. 11, operations begin by setting counter 1 to zero, by setting counter k to M, and by setting variable $SNR_{Max}$ to zero (block 620). At this point, the set $S_1$ which contains the probing fingers that are to be combined is an empty set. Then, in the operation of block 621, a total of M probing fingers are identified as combining fingers and hence added to set $S_1$, and the set $S_0$ is defined (as usual) as all the probing fingers that are not currently designated as combining fingers. In embodiments of this search technique, the "predesignated" combining fingers are the probing fingers at each multipath position.

A set $S_t$ is then defined as the union of set $S_1$ and the $l^{th}$ member of set $S_0$ (block 622). The SNR metric as calculated from Equation (2) for set $S_t$ is then computed and compared to $SNR_{Max}$ (block 624). As at this point $SNR_{Max}$ has been set to zero, operations continue at block 626 where $SNR_{Max}$ is set to the SNR of $S_t$ computed from Equation (2), and a variable d is fixed as $S_0(l)$ (which at this point is the first probing finger in set $S_0$ since l=0). The counter l is then incremented (block 628), and l is compared to the value K−k (block 630), where k indicates the number of entries currently in set $S_1$. As long as l is less than K−k, operations continue at block 622. The operations of blocks 622 through 630 are then repeated until l=K−k, at which point the probing finger having the highest SNR metric will have been identified. Note that during these operations if the SNR of the current probing finger is less than $SNR_{Max}$, then the operations of block 626 are skipped. In this manner, when at block 630 l equals K−k (i.e., all of the probing fingers in set $S_0$ have been searched), $SNR_{Max}$ will be equal to the SNR of the probing finger with the highest SNR, and d will identify this probing finger.

At this point, operations continue at block 632 of FIG. 11, where probing finger d is added to set $S_1$, and counter k is incremented by 1 to reflect this addition to set $S_1$. Counter k is then compared to $K_c$ (block 634). If k is less than $K_c$, operations continue by resetting both counter l and $SNR_{Max}$ to zero (block 636), and by removing probing finger d from set $S_0$ (block 638). Operations then continue at block 622 as described above, except that in this case when looping through blocks 622 through 630 set $S_t$ contains an additional member, and the operations identify the probing finger which in combination with the probing fingers identified during the initial loops through blocks 622 through 630 maximizes the SNR metric. These operations continue as shown in FIG. 11 until k=$K_c$, at which point set $S_1$ contains the $K_c$ probing fingers which are to be used as combining fingers.

Figures 12A, 12B, 12C, 12D:
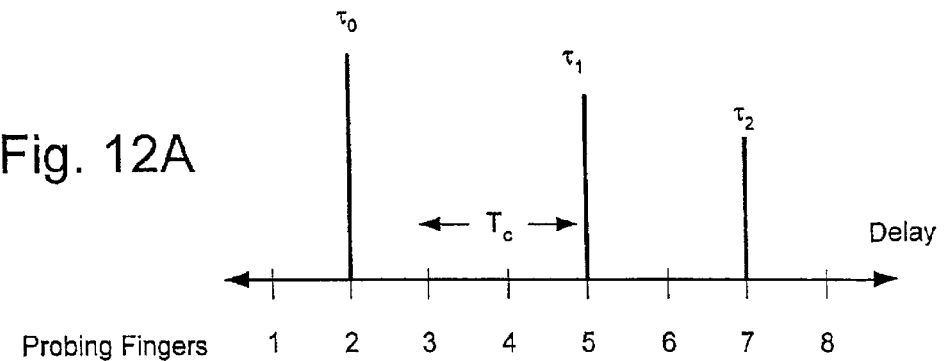
FIGS. 12A–D illustrate an example of a constrained ordered search which may be used in embodiments of the present invention.

FIGS. 12A–D shows an example of a constrained ordered search similar to the unconstrained ordered search depicted in FIG. 10. In the example of FIGS. 12A–D, it is assumed that there are three multipath signals (L=3), that the number of probing fingers (K) is eight, and that the number of probing fingers which are to be combined ($K_c$) is five. As shown in FIG. 12A, eight probing fingers have been selected, at $T_c/2$ intervals starting at $\tau_0-T_c/2$ and ending at $\tau_2+T_c/2$ (numbered sequentially from 1 to 8 in the figure) As shown in FIG. 12B, pursuant to the constrained portion of the search (step 0), the probing fingers corresponding to each multipath are added to the set of probing fingers that are to be combined. As shown in FIG. 12C, during the first step (step 1) of the search (i.e., k=3), the SNR metric of Equation (2) for the combination of the three selected probing fingers and each of the remaining probing fingers is evaluated to determine which probing finger, when combined with probing fingers 2, 5 and 7, provides the highest SNR (in the case of the example of FIG. 12, probing finger 1 which is labeled as being the "best"), and probing finger 1 is added to the set of probing fingers that are to be combined. Then, as shown in FIG. 12D, during the second step of the search (i.e., k=4), the SNR metric of Equation (2) for the combination of the selected probing fingers (fingers 1, 2, 5 and 7) and each of the remaining probing fingers (fingers 3, 4, 6 and 8) are evaluated to determine which probing finger, when combined with probing fingers 1, 2, 5, and 7, provides the highest SNR (in the case of the example of FIG. 12D, probing finger 8 which is labeled as being the "best"), and probing finger 8 is added to the set of probing fingers that are to be combined.

In each of the above searches, the ability to suppress interference may be dependent on the number of combining fingers ($K_c$) designated. However, the larger the number of combining fingers, the more computationally complex the various searches become. In certain embodiments of the present invention, $K_c$ is a fixed number. However, in other embodiments, $K_c$ is a variable parameter that can be adjusted based on, for example, the number of multipath signals. $K_c$ can also be adaptively adjusted by deciding whether or not to continue a search based on the difference in SNR (or some other metric) between the k and k+1 steps of the search, and comparing that improvement to a threshold. Such a threshold can be a fixed number, or alternatively can be determined as some function of k. The parameter $K_c$ may also depend on the number of active base stations as well as the processing capabilities of the receiver.

It will also be appreciated that the combining finger selection algorithms discussed herein may be extended to cover the soft handoff situation where a mobile terminal transfers from one base station to a second base station. During such a soft handoff, the mobile terminal is simultaneously maintaining communications links with two or even three separate base stations. In this situation, the algorithms discussed above for selecting probing fingers and combining fingers may be extended to take into account that desired signals are incident on the mobile terminal from multiple base stations. In particular, the methodology used to select probing fingers, such as the methodology depicted in FIG. 7 (or alternative methodologies, such as those discussed in the text above) may be repeated for each of the base stations involved in the soft handoff. Then, in the combining finger selection process, all of these probing fingers can be searched using the aforementioned brute-force or ordered search methods (or some other search method). During such soft-handoff situations, it may be desirable during the combining finger search process to cap the number of combining fingers which may be included for any given base stations to a value $K_B$. When such a cap is in place, any combination of probing fingers that would include more than $K_B$ probing fingers that were selected with respect to a particular base station are excluded in the combining finger search. This serves to both reduce the complexity of the combining finger search process, and may also enhance performance in certain situations, as combining too many fingers can reduce performance when estimation noise is present (e.g., noise in covariance matrix R). The threshold used to determine the number of combining fingers per base station ($K_B$) may depend on which base station is being considered and how many fingers are already on certain base stations.

For the IW-RAKE receiver, the search methods already described can be applied to precombined groups of fingers rather than to fingers. Thus, there would be groups of probing fingers corresponding to shifts of plus or minus integer multiples of d from the multipath locations used in conventional RAKE combining. These groups of fingers would be precombined using RAKE combining. Then, the noise covariance of these precombined groups would be estimated and used in determining which precombined groups to use in a second stage of combining.

Noise Covariance Shaping

As noted above, estimation noise in noise correlation matrix R can reduce the performance of receivers constructed according to the teachings of the present invention. Accordingly, performance can be enhanced in many situations by modifying off-diagonal elements of R, particularly in situations in which the off-diagonal correlations are small. For example, a predetermined threshold c may be set which represents a minimum correlation value, and for each element $r_{ij}$ of matrix R, $r_{ij}$ is set to zero if $|r_{ij}|$ is less than c. Such noise covariance shaping may serve to both reduce the impact of estimation noise and to reduce the processing required in the selection of the combining fingers. In the case where an element $r_{ij}$ of R is set to zero, the probing finger pair $d_i$, $d_j$ may be treated more like RAKE fingers.

Instead of setting a subset of the off-diagonal elements equal to zero as described above, they may instead be modified using either linear or non-linear approaches. One such approach is to scale the off-diagonal elements in R by a value between zero and one. However, this has the effect of subtracting a larger degree of correlation for elements where the correlation is high. In another approach, a fixed amount (in magnitude) may be subtracted from all off-diagonal elements (where a floor operation is used if the fixed amount exceeds the smallest element). In yet another approach, the amount removed from off-diagonal elements could depend on the value of those elements. For instance, each element $r_{ij}$ could be replaced by $(\gamma)(|q|)(r_{ij})$, where $\gamma$ is a parameter (e.g., 2) and where $q=r_{ij}/\max(r_{ii}, r_{jj})$, i.e., q corresponds to a normalized complex correlation $q=q_I+jq_Q$. The magnitude of q ($|q|$) may be approximated as: $0.4(|q_I|+|q_Q|)+0.6\max\{|q_I|, |q_Q|\}$. A clipping function may also be used so that the scaled value never exceeds one. In such a technique, large correlation values may remain unchanged, whereas small ones may be scaled down.

Figure 15:
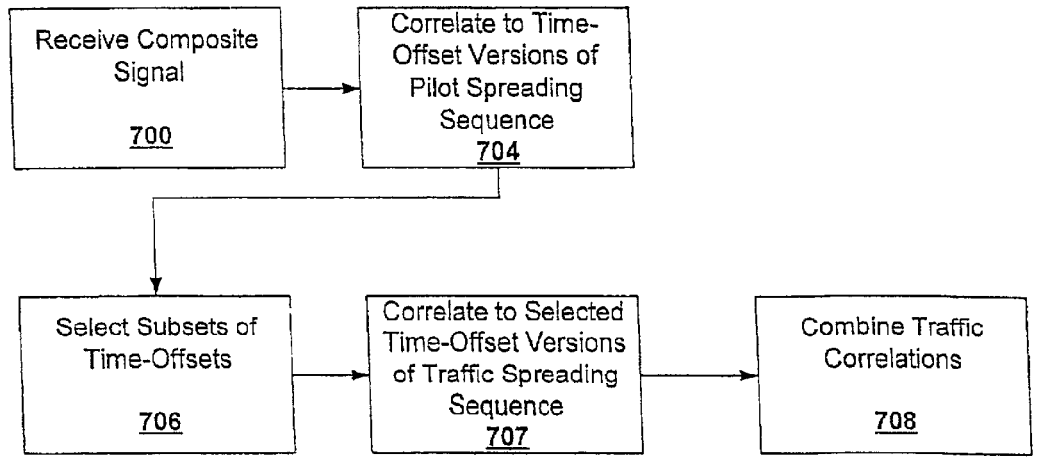
FIG. 15 is a flow chart illustrating methods of recovering information encoded in a spread spectrum signal according to embodiments of the present invention.

FIG. 15 is a flowchart diagram depicting a method of recovering information encoded in a spread spectrum signal transmitted according to a spreading sequence in a communications medium according to embodiments of the present invention. As illustrated in FIG. 15, a composite signal that includes the spread spectrum signal is received from the communications medium (block 700). In many instances, a plurality of multipath versions of this signal will be received, with each version being offset from the other versions in time. After receiving the composite signal, the receiver may generate time-offset correlations of the composite signal with the pilot spreading sequence to produce a plurality of time-offset correlations of the composite signal with the pilot spreading sequence (block 704). A subset of these time-offsets may then be selected, using any of a number of different selection techniques and criteria, including the various examplary techniques described above (block 706). The selected time-offsets are used to correlate the received signal to one or more traffic spreading sequences. Finally, the traffic correlations may then be combined in a weighted combination to estimate information encoded in the transmitted spread spectrum signal (block 708).

In FIG. 15, in the selection process of block 706, estimated combining weights are typically produced in the selection process. These weights may be used in the combining process of 708. Specifically, these weights may be used as initial weights. As the selection process may only occur every certain number of symbol intervals (e.g., every other time slot in a WCDMA system), the combining weights may need to be updated several times before the next selection process occurs. While the selection process provides initial weight values, these values can be updated as the noise covariance and the net channel response change. Because these change slowly, the Gauss-Seidel approach with only one iteration may be used.

Figure 16:
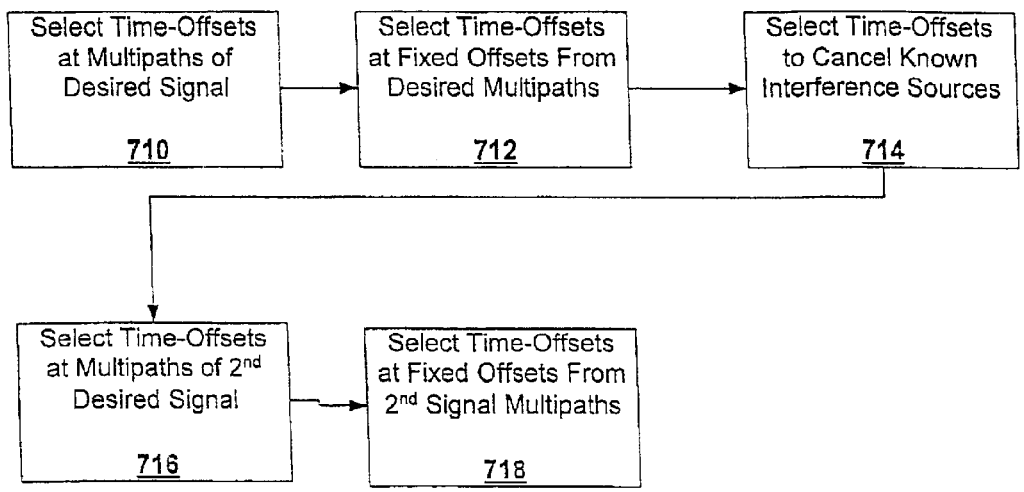
FIG. 16 is a flow chart illustrating methods of recovering information encoded in a spread spectrum signal according to alternative embodiments of the present invention.

FIG. 16 provides additional details as to how the time-offsets may be selected that are used in block 704 of FIG. 15 in generating a plurality of time-offset versions of the received composite signal. As shown in FIG. 16, a set of time-offsets may first be selected that correspond to the locations of each multipath of the received composite signal (block 710). In this manner, the RAKE receiver will have a probing finger aligned with each such multipath. A second set of time-offsets may then be selected that are located at fixed offsets from each of the time-offsets in the first set of time-offsets (block 712). As discussed above with reference to FIG. 7, in embodiments of the present invention these fixed offsets include time offsets of d, −d, 2d, −2d, etc. from each multipath of the received composite signal, where d is typically an integer multiple of one quarter the value of the modulation chip period of the spread spectrum signal. A third set of time-offsets may also be selected at locations which facilitate canceling a known interference source (block 714), as described above with respect to FIGS. 13 and 14. Additionally, in situations where a soft-handoff is occurring, a fourth and fifth set of time-offsets may also be selected (blocks 716, 718) which correspond to the first and second sets of time-offsets, except they are taken with respect to the multipaths of a second composite signal that is received from a second active base station.

In the present disclosure, operations of the present invention are described, in part, by a series of flowcharts and block diagrams. It will be appreciated that blocks and combinations of blocks of these flowcharts and block diagrams can be implemented using special purpose hardware such as discrete analog and/or digital hardware, ASICs or gate arrays used to implement apparatus, such as the receiver apparatus described herein with reference to FIGS. 5 and 6. The blocks and combinations of blocks of the flowcharts and block diagrams can also be implemented using computer program instructions which may be loaded and executed on a computer or other programmable apparatus, such as a microcontroller, microprocessor, ASIC, DSP or other processing circuit used to implement apparatus, such as the receiver apparatus described herein with reference to FIGS. 5 and 6, to produce a machine such that the instructions which execute on the computer or other programmable data processing apparatus create means for implementing the functions specified in the flowchart block or blocks. The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions specified in the flowchart and block diagram block or blocks. Accordingly, blocks of the flowcharts and block diagrams support combinations of means for performing the specified functions and combinations of steps for performing the specified functions. It will also be understood that each block of the flowcharts and block diagrams and combinations of blocks therein, can be implemented by special purpose hardware-based computer systems which perform the specified functions or steps, or combinations of special purpose hardware and computer instructions.

It will also be appreciated that other operations may be used in conjunction with or instead of the operations illustrated in the flow chart diagrams. For example, the selection of the subset of probing fingers to be combined may be made with respect to some relative measure other than signal-to-noise ratio (SNR), such as relative signal strength.

As will be appreciated by one of skill in the art, the present invention may be embodied as a method, data processing system, or computer program product. Accordingly, the present invention may take the form of an entirely hardware embodiment, an entirely software embodiment or an embodiment combining software and hardware aspects all generally referred to herein as a "circuit." Furthermore, the present invention may take the form of a computer program product on a computer-usable storage medium having computer-usable program code means embodied in the medium. Any suitable computer readable medium may be utilized including hard disks, CD-ROMs, optical storage devices, a transmission media such as those supporting the Internet or an intranet, or magnetic storage devices.

In the drawings and specification, there have been disclosed typical embodiments of the invention and, although specific terms are employed, they are used in a generic and descriptive sense only and not for purposes of limitation, the scope of the invention being set forth in the following claims.

That which is claimed:

1. A method of recovering information encoded in a spread spectrum signal transmitted in a communications medium, the method comprising:
    receiving at least one multipath version of a composite signal including the spread spectrum signal from the communications medium;
    selecting a set of time-offsets;
    correlating the composite signal with a spreading sequence at each of the time-offsets in the set of time-offsets to produce a first set of time-offset correlations of the composite signal with the spreading sequence;
    estimating noise correlation among the time-offset correlations to produce noise correlation estimates;
    selecting a subset of the time-offsets from the set of time-offsets based on the noise correlation estimates;
    correlating the composite signal with a traffic spreading sequence at each of the time-offsets in the selected subset of the time-offsets to produce a plurality of traffic correlations; and
    combining the plurality of traffic correlations using a weighted combination to estimate information encoded in the transmitted spread spectrum signal.

2. The method of claim 1, wherein the set of time-offsets selected comprise time-offsets corresponding to the times at which the multipath versions of the composite signal are received.

3. The method of claim 2, wherein the set of time-offsets selected further comprise time-offsets at a fixed distance in time from the times at which multipath versions of the composite signal are received.

4. The method of claim 2, wherein the set of time-offsets selected further comprise time-offsets at integer multiples of a fixed distance in time from the times at which multipath versions of the composite signal are received.

5. The method of claim 4, wherein the fixed distance is an integer multiple of one quarter the value of the modulation chip period of the spread spectrum signal.

6. The method of claim 1, wherein selecting a subset of the time-offsets from the set of time-offsets based on the noise correlation estimates comprises:
    determining a performance metric that is associated with each of a plurality of subsets of the first set of time-offset correlations; and
    selecting as the subset of the time offsets the time offsets corresponding to one of the plurality of the subsets of the first set of time-offset correlations that has a performance metric meeting a predetermined criterion.

7. The method of claim 6, wherein each of the plurality of subsets of the first set of time-offset correlations comprises the same number of members, and wherein the number of members is predetermined.

8. The method of claim 6, further comprising determining the number of multipaths of the composite signal that are received from the communications medium, and wherein the number of members in each of the plurality of subsets of the first set of time-offset correlations is determined as a function of the number of multipaths of the composite signal received.

9. The method of claim 6, wherein each of the plurality of subsets of the first set of time-offset correlations comprises the same number of members, and wherein the number of members is adaptively selected based on the improvement in the value of the performance metric provided by successive increases in the number of members.

10. The method of claim 6, wherein the performance metric is a signal-to-noise ratio.

11. The method of claim 6, wherein determining a performance metric that is associated with each of a plurality of subsets of the first set of time-offset correlations comprises determining the performance metric that results from the weighted combinations of each distinct subset of different time-offset correlations in the first set of time-offset correlation that has a specific number of members.

12. The method of claim 6, wherein determining a performance metric that is associated with each of a plurality of subsets of the first set of time-offset correlations comprises:
    creating a first group of time-offset correlations that comprises the time-offset correlations that are aligned in time with at least some of the multipath versions of the composite signal received;

determining values for the performance metric that result from the weighted combinations of each distinct subset of different time-offset correlations having a specific number of members that comprises the time-offset correlations in the first group of time-offset correlations.

13. The method of claim 6, wherein selecting as the subset of the time offsets the time offsets corresponding to one of the plurality of the subsets of the first set of time-offset correlations that has a performance metric meeting a predetermined criterion comprises using an ordered search to identify time-offsets corresponding to the subset of the first set of time-offset correlations that has a specific number of members and a weighted combination that maximizes the performance metric.

14. The method of claim 13, wherein the ordered search comprises:

identifying as a first time-offset the time-offset corresponding to the time-offset correlation that maximizes the performance metric for the case where the number of members in the subset of the plurality of time-offset correlations is equal to one; and then identifying as a second time-offset the time-offset corresponding to the time-offset correlation that when combined in a weighted combination with the time-offset correlation having the first time-offset maximizes the performance metric for the case where the number of members in the subset of the plurality of time-offset correlations is equal to two; and then identifying as a third time-offset the time-offset corresponding to the time-offset correlation that when combined in a weighted combination with the time-offset correlations having the first and second time-offsets maximizes the performance metric for the case where the number of members in the subset of the plurality of time-offset correlations is equal to three; and then continuing to sequentially identify additional time-offsets by sequentially identifying as another time-offset the time-offset corresponding to the time-offset correlation that when combined in a weighted combination with the time-offset correlations having the already identified time-offsets maximizes the performance metric, until a desired number of time-offsets have been identified.

15. The method of claim 13, wherein the ordered search comprises a constrained ordered search wherein initially at least some of the time-offsets that are aligned in time with received multipath versions of the composite signal are selected as part of the subset of the time-offsets.

16. The method of claim 2, wherein the set of time-offsets selected further comprise time-offsets at intervals shifted both forward and backwards in time from the times at which multipath versions of the composite signal are received by the differential delay between two multipath signals received from an interference source.

17. The method of claim 2, wherein the set of time-offsets selected further comprise time-offsets corresponding to the times at which multipath versions of a second composite signal are received.

18. The method of claim 3, wherein the set of time-offsets selected further comprise time-offsets corresponding to:

the times at which multipath versions of a second composite signal are received; and shifts in time from the times at which multipath versions of the second composite signal are received.

19. The method of claim 6, wherein the weights used to form the weighted combination are generated based on the noise correlation estimates and the estimated net channel response of the time-offset correlations in the first set of time-offset correlations.

20. The method of claim 19, wherein the noise correlation estimates comprises a noise correlation matrix, and wherein off-diagonal elements in the noise correlation matrix are modified to reduce estimation noise.

21. The method of claim 20, wherein the modification to the noise correlation matrix comprises setting off-diagonal elements of the matrix to zero that are less than a predetermined threshold.

22. The method of claim 20, wherein the modification to the noise correlation matrix comprises subtracting a fixed amount from all off-diagonal elements of the matrix.

23. The method of claim 20, wherein the modification to the noise correlation matrix comprises scaling all off-diagonal elements of the matrix by a value between zero and one.

24. The method of claim 20, wherein the modification to the noise correlation matrix comprises a non-linear operation that reduces off-diagonal elements of the matrix having small values by different amounts than off-diagonal elements having larger values.

25. A method of recovering information encoded in a spread spectrum signal transmitted in a communications medium, the method comprising:

receiving at least one multipath version of a composite signal including the spread spectrum signal from the communications medium;

selecting a set of time-offsets based at least in part on the times at which multipath versions of an interfering signal are received;

correlating the composite signal with a spreading sequence based on the selected set of time-offsets to produce a plurality of time-offset correlations of the composite signal with the spreading sequence;

estimating noise correlation among the plurality of time-offset correlation to produce noise correlation estimates;

selecting a subset of the set of time-offsets based on the noise correlation estimates;

correlating the composite signal with a traffic spreading sequence at each of the time-offsets in the selected subset of the time-offsets to produce a plurality of traffic correlations; and combining the plurality of traffic correlations using a weighted combination to estimate information encoded in the transmitted spread spectrun signal.

26. The method of claim 25, wherein the set of time-offsets selected further comprise time offsets corresponding to the times at which multipath versions of the composite signal are received.

27. The method of claim 26, wherein selecting a set of time-offsets based at least in part on the times at which multipath versions of an interfering signal are received further comprises selecting time-offsets corresponding to:

the time at which at least one multipath version of the composite signal is received plus the differential delay between at least one distinct pair of multipath signals received from an interference source; and the time at which at least one multipath version of the composite signal is received minus the differential delay between at least one distinct pair of multipath signals received from an interference source.

28. A method of recovering information encoded in a spread spectrum signal transmitted in a communications medium, the method comprising:

receiving at least one multipath version of a composite signal including the spread spectrum signal from the communications medium;

selecting a set of time-offsets, wherein the set of time-offsets comprises a set of desired signal offsets that correspond to the times at which multipath versions of the composite signal are received, and a set of noise probing offsets that are integer multiple offsets of a predetermined value from the desired signal offsets;

correlating the composite signal with a spreading sequence at each of the time-offsets in the selected set of time-offsets to produce a plurality of time-offset correlations of the composite signal with the spreading sequence;

estimating noise correlation among the plurality of time-offset correlations to produce noise correlation estimates;

selecting a subset of the set of time-offsets based on the noise correlation estimates;

correlating the composite signal with a traffic spreading sequence at each of the time-offsets in the selected subset of the time-offsets to produce a plurality of traffic correlations; and combining the plurality of traffic correlations using a weighted combination to estimate information encoded in the transmitted spread spectrum signal.

29. The method of claim 28, wherein the set of time-offsets selected further comprises time-offsets that are shifted both forwards and backwards in time from each of the time-offsets in the set of desired signal offsets by the differential delays between each distinct pair of multipath signals received from an interference source.

30. A wireless terminal, comprising:

a transmitter;

a receiver;

a user interface coupled to the transmitter and the receiver;

an antenna coupled to the transmitter and the receiver;

a correlation timing determiner circuit that selects a set of correlation times based on the times at which multipath versions of a desired signal are received;

a correlation circuit, operatively associated with the correlation timing determiner and responsive to a received composite signal, that generates respective time-offset correlations of the composite signal with a sequence at respective correlation times of the selected set of correlation times;

a noise correlation estimation circuit that estimates noise correlation;

a combining finger selector circuit that selects a subset of the correlation times based on the noise correlation estimates; and a combiner circuit that combines correlations of the composite signal at the selected subset of the correlation times with a traffic spreading sequence to produce an estimate of information contained in the composite signal.

31. The wireless terminal according to claim 30, wherein the correlation timing determiner circuit selects correlation times at the times at which each multipath version of the composite signal are received.

32. The wireless terminal according to claim 31, wherein the correlation timing determiner circuit further selects correlation times that are offset by a fixed value from the times at which each multipath version of the composite signal is received.

33. The wireless terminal according to claim 30, wherein the combining finger selector circuit is configured to select a subset of the correlation times by determining the value of the weighted combination of each distinct subset of a specified number of different time-offset correlations, and selecting the subset of time-offset correlations having the highest value.

34. The wireless terminal according to claim 30, wherein the combining finger selector circuit is configured to:

select a first group of time-offset correlations that correspond to the time-offsets that are aligned in time with the M strongest received multipath versions of the composite signal; and determining the value of the weighted combination of each distinct subset of a specified number of different time-offset correlations that comprises the time-offset correlations in the first group of time-offset correlations and selecting from these subsets the subset of time-offset correlations having the highest value of the weighted combination.

35. The wireless terminal according to claim 30, wherein the combining finger selector circuit is configured to select a subset of the correlation times using an ordered search to identify the subset of a specified number of the plurality of time-offset correlations having a weighted combination that maximizes a performance metric.

36. A system for recovering information encoded in a spread spectrum signal transmitted in a communications medium, comprising:

means for receiving at least one multipath version of a composite signal including the spread spectrum signal from the communications medium;

means for selecting a set of time-offsets;

means for correlating the composite signal with a spreading sequence at each of the time-offsets in the set of time-offsets to produce a first set of time-offset correlations of the composite signal with the spreading sequence;

means for estimating noise correlation among the time-offset correlations to produce noise correlation estimates;

means for selecting a subset of the time-offsets from the set of time-offsets based on the noise correlation estimates;

means for correlating the composite signal with a traffic spreading sequence at each of the time-offsets in the selected subset of the time-offsets to produce a plurality of traffic correlations; and means for combining the plurality of traffic correlations using a weighted combination to estimate information encoded in the transmitted spread spectrum signal.

37. The system of claim 36, wherein the means for selecting a set of time-offsets comprises means for selecting time-offsets corresponding to the times at which multipath versions of the composite signal are received.

38. The system of claim 37, wherein the means for selecting a set of time-offsets further comprises means for selecting time-offsets a distance d in time from the times at which multipath versions of the composite signal are received.

39. The system of claim 36, wherein the means for selecting a subset of the time-offsets from the set of time-offsets comprises:

means for determining a performance metric that is associated with each of a plurality of subsets of the first set of time-offset correlations; and means for selecting as the subset of the time offsets the time offsets corresponding to one of the plurality of the subsets of the first set of time-offset correlations that has a performance metric meeting a predetermined criterion.

40. The system of claim 37, wherein the means for selecting a set of time-offsets further comprises means for selecting time-offsets at intervals shifted both forward and backwards in time from the times at which multipath versions of the composite signal are received by the differential delay between two multipath signals received from an interference source.

41. The system of claim 37, wherein the means for selecting a set of time-offsets further comprises means for selecting time-offsets corresponding to the times at which multipath versions of a second composite signal are received.

42. The method of claim 10, wherein the signal-to-noise ratio is determined using a set of channel estimates and the noise correlation estimates.

43. A receiver, comprising:

a receiver;

a correlation timing determiner circuit that selects a set of correlation times based on the times at which multipath versions of a desired signal are received;

a correlation circuit, operatively associated with the correlation timing determiner and responsive to a received composite signal, that generates respective time-offset correlations of the composite signal with a sequence at respective correlation times of the selected set of correlation times;

a noise correlation estimation circuit that estimates noise correlation;

a combining finger selector circuit that selects a subset of the correlation times based on the noise correlation estimates; and a combiner circuit that combines correlations of the composite signal at the selected subset of the correlation times with a traffic spreading sequence to produce an estimate of information contained in the composite signal.

44. The receiver according to claim 43, wherein the correlation timing determiner circuit selects correlation times at the times at which each multipath version of the composite signal are received.

45. The receiver according to claim 44, wherein the correlation timing determiner circuit further selects correlation times that are offset by a fixed value from the times at which each multipath version of the composite signal is received.

46. The receiver according to claim 43, wherein the combining finger selector circuit is configured to select a subset of the correlation times by determining the value of the weighted combination of each distinct subset of a specified number of different time-offset correlations, and selecting the subset of time-offset correlations having the highest value.

47. The receiver according to claim 43, wherein the combining finger selector circuit is configured to:

select a first group of time-offset correlations that correspond to the time-offsets that are aligned in time with the M strongest received multipath versions of the composite signal; and determining the value of the weighted combination of each distinct subset of a specified number of different time-offset correlations that comprises the time-offset correlations in the first group of time-offset correlations and selecting from these subsets the subset of time-offset correlations having the highest value of the weighted combination.

48. The receiver according to claim 43, wherein the combining finger selector circuit is configured to select a subset of the correlation times using an ordered search to identify the subset of a specified number of the plurality of time-offset correlations having a weighted combination that maximizes a performance metric.

* * * * *

UNITED STATES PATENT AND TRADEMARK OFFICE
CERTIFICATE OF CORRECTION

PATENT NO. : 6,922,434 B2
DATED : July 26, 2005
INVENTOR(S) : Wang et al.

It is certified that error appears in the above-identified patent and that said Letters Patent is hereby corrected as shown below:

Title page,
Item [56], References Cited, OTHER PUBLICATIONS, add:
-- European Patent Office Standard Search Report for U.S. Application No. 09/845,950, dated November 20, 2001 --.

Signed and Sealed this

Sixth Day of June, 2006

JON W. DUDAS
*Director of the United States Patent and Trademark Office*